(12) United States Patent
Sasaki et al.

(10) Patent No.: US 10,515,437 B2
(45) Date of Patent: Dec. 24, 2019

(54) IMAGE PROCESSING APPARATUS AND IMAGE PROCESSING METHOD THAT PERFORM NOISE REDUCTION PROCESSING ON IMAGE DATA

(71) Applicant: CANON KABUSHIKI KAISHA, Tokyo (JP)

(72) Inventors: Yoshitaka Sasaki, Kawasaki (JP); Kazuhiro Yahata, Kunitachi (JP); Atsushi Takahama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/659,746

(22) Filed: Jul. 26, 2017

(65) Prior Publication Data

US 2017/0323430 A1     Nov. 9, 2017

Related U.S. Application Data

(62) Division of application No. 14/056,119, filed on Oct. 17, 2013, now Pat. No. 9,818,176.

(30) Foreign Application Priority Data

Oct. 25, 2012  (JP) .................................. 2012-235851
Jul. 9, 2013   (JP) .................................. 2013-143746
Oct. 3, 2013   (JP) .................................. 2013-208154

(51) Int. Cl.
*G06T 5/00*     (2006.01)
*G06T 5/20*     (2006.01)

(52) U.S. Cl.
CPC ............... *G06T 5/002* (2013.01); *G06T 5/20* (2013.01); *G06T 2207/20012* (2013.01); *G06T 2207/20016* (2013.01); *G06T 2207/20192* (2013.01)

(58) Field of Classification Search
CPC .................................. G06T 5/002; G06T 5/20
(Continued)

(56) References Cited

U.S. PATENT DOCUMENTS 7,656,442 B2    2/2010   Tsuruoka
8,253,825 B2    8/2012   Morel et al.
(Continued)

FOREIGN PATENT DOCUMENTS

JP   2007-536662 A   12/2007
JP   2011-039675 A    2/2011
JP   2012-191311 A   10/2012

OTHER PUBLICATIONS

Japanese Official Action dated Aug. 8, 2017, issued in corresponding Japanese Patent Application No. 2013-208154.
(Continued)

*Primary Examiner* — Sinh Tran
*Assistant Examiner* — Zhenzhen Wu
(74) *Attorney, Agent, or Firm* — Venable LLP

(57) ABSTRACT

An image processing apparatus includes a processing unit to perform noise reduction processing on image data and an output unit to output noise-reduced output image data. The processing unit determines a weight for a reference pixel based on a target area including a target pixel and a reference area including the reference pixel and sets, as a pixel value of the target pixel on which processed noise reduction processing has been executed, a value calculated using reference pixels and a weight corresponding to each of the reference pixels. The size of the target area equals to the size of the reference area. The output unit outputs, as the pixel value of the target pixel after noise reduction processing, either a first value, calculated when a first pixel group is set as the target area, or a second value, calculated when a second pixel group is set as the target area.

20 Claims, 29 Drawing Sheets

(58) Field of Classification Search
USPC .......................................... 348/241; 382/275
See application file for complete search history.

(56) References Cited

U.S. PATENT DOCUMENTS

| | | | |
|---|---|---|---|
| 8,385,677 B2 | 2/2013 | Hu et al. | |
| 8,427,559 B2 | 4/2013 | Morel et al. | |
| 8,594,456 B2 | 11/2013 | Yang et al. | |
| 8,693,801 B2 | 4/2014 | Nakamura et al. | |
| 8,699,816 B2 | 4/2014 | Han et al. | |
| 8,750,638 B2 | 6/2014 | Hara | |
| 8,768,093 B2 | 7/2014 | Yoo et al. | |
| 8,885,965 B2 | 11/2014 | Yang et al. | |
| 8,953,903 B2 | 2/2015 | Peng et al. | |
| 9,204,853 B2 | 12/2015 | Foos et al. | |
| 9,438,912 B2 | 9/2016 | Matsumura et al. | |
| 2006/0066736 A1 | 3/2006 | Tsuruoka | |
| 2006/0245660 A1* | 11/2006 | Hung | H04N 5/217 382/254 |
| 2009/0052798 A1* | 2/2009 | Kwon | H04N 5/357 382/264 |
| 2009/0087121 A1 | 4/2009 | Han et al. | |
| 2009/0161982 A1 | 6/2009 | Tico et al. | |
| 2010/0141804 A1 | 6/2010 | Morel et al. | |
| 2010/0183240 A1* | 7/2010 | Hiraga | G06T 5/002 382/264 |
| 2011/0069886 A1* | 3/2011 | Chien | G06T 5/002 382/190 |
| 2011/0069902 A1 | 3/2011 | Yang et al. | |
| 2011/0069904 A1 | 3/2011 | Yang et al. | |
| 2011/0081096 A1* | 4/2011 | Kim | G06T 5/002 382/264 |
| 2011/0142368 A1* | 6/2011 | Shin | G06T 5/002 382/275 |
| 2012/0027319 A1 | 2/2012 | Hu et al. | |
| 2012/0121203 A1 | 5/2012 | Hara | |
| 2012/0275710 A1 | 11/2012 | Peng et al. | |
| 2012/0288194 A1 | 11/2012 | Nakamura et al. | |
| 2013/0142441 A1* | 6/2013 | Goto | G06T 5/002 382/218 |
| 2013/0329999 A1* | 12/2013 | Imagawa | G06K 9/40 382/167 |
| 2013/0336393 A1 | 12/2013 | Matsumura et al. | |
| 2014/0028880 A1* | 1/2014 | Kawaguchi | H04N 5/357 348/241 |
| 2014/0064615 A1 | 3/2014 | Ren et al. | |

OTHER PUBLICATIONS

English translation of Japanese Official Action dated Aug. 8, 2017, issued in corresponding Japanese Patent Application No. 2013-208154.

* cited by examiner

| 1 | 2 | 1 |
|---|---|---|
| 2 | 4 | 2 |
| 1 | 2 | 1 |

FIG.22

IMAGE PROCESSING APPARATUS AND IMAGE PROCESSING METHOD THAT PERFORM NOISE REDUCTION PROCESSING ON IMAGE DATA

CLAIM OF PRIORITY

This application is a divisional application of copending U.S. patent application Ser. No. 14/056,119, filed Oct. 17, 2013, which is hereby incorporated by reference herein in its entirety.

This application also claims the benefit of Japanese Patent Application Nos. 2012-235851, filed Oct. 25, 2012, No. 2013-143746, filed Jul. 9, 2013, and No. 2013-208154, filed Oct. 3, 2013, which are hereby incorporated by reference herein in their entirety.

BACKGROUND OF THE INVENTION

Field of the Invention

The present invention relates to an image processing apparatus and an image processing method for reducing noise contained in image data.

Description of the Related Art

Digital still cameras and digital video cameras have come into widespread general use. These digital image capturing devices generate digital image data by converting, into digital signals, light received by a photoelectric conversion element (image capturing element), such as a CCD or a CMOS sensor.

In the process of generating digital image data, noise, such as dark-current noise, thermal noise, and shot noise is generated by the characteristics of the image capturing element and circuit, and contaminates the digital image data. The noise is more noticeable now than before since the image capturing element of recent years is reduced in size, has more pixels, and, therefore, has a super-high pixel pitch. The noise is generated markedly and is a strong factor of image degradation especially in a case, for example, when ISO sensitivity is increased. For this reason, contaminating noise needs to be reduced to obtain a high-quality image.

In a conventionally-known method, noise is reduced by using a low-pass filter that allows only a signal component at or below a noise frequency to pass therethrough. However, this method blurs, not only the noise, but also, the edge, and, therefore, makes it difficult to obtain a high-quality image. Thus, a number of methods have been proposed for reducing noise adaptively by sorting out, in some way, information on the noise and information on the edge.

General adaptive noise reduction reduces noise in the following manner. Specifically, to reduce noise in a target pixel, multiple pixels near the target pixel are selected as reference pixels, and the value of the target pixel is replaced with an appropriate weighted average of the reference pixels.

As one of methods for the adaptive noise reduction, there is proposed a method that achieves noise reduction by defining an area including a target pixel (a target area), obtaining the similarity between the target pixel and its reference pixels in a unit of the area, and using a weighted average according to the similarity (see Japanese Patent Laid-Open Nos. 2007-536662 and 2011-39675).

However, the methods of Japanese Patent Laid-Open Nos. 2007-536662 and 2011-39675 have a problem that an image that has both an area containing many edges, such as buildings, and a smooth area, such as the sky, exhibits different noise reduction effects depending on the areas. This is because the similarity between a target area and reference pixels varies depending on how the target area is determined. For example, setting a small area as the target area so as to achieve a high noise reduction effect in the area containing edges lowers the noise reduction effect for the smooth area. Conversely, setting a large area as the target area so as to achieve a high noise reduction effect in the smooth area lowers the noise reduction effect for the area containing edges.

SUMMARY OF THE INVENTION

The present invention provides an image processing apparatus and an image processing method capable of, even in a case when input image data includes both an area containing edges and a smooth area, generating image data reduced in noise for both of the areas.

An image processing apparatus according to the present invention is an image processing apparatus that performs image processing on image data and includes a first correction unit configured to correct a pixel value of a target pixel in the image data based on a first similarity between a first target pixel group including the target pixel and a first reference pixel group including a reference pixel, a second correction unit configured to correct the pixel value of the target pixel based on a second similarity between a second target pixel group including the target pixel and a second reference pixel group including a reference pixel, and an output unit configured to obtain corrected image data by using the result of the first correction step and the result of the second correction step based on the first similarity and the second similarity, and to output the corrected image data.

With the present invention, even in a case when input image data includes both of an area containing edges, such as buildings, and a smooth area, such as the sky, image data reduced in noise for both of the areas can be generated. Thus, high-quality image data reduced in noise can be generated, irrespective of a captured object recorded in the image data.

BRIEF DESCRIPTION OF THE DRAWINGS

FIG. 22 is a schematic diagram showing an example of a filter used in low-pass filter processing in Embodiment 4 of the present invention;

DESCRIPTION OF THE EMBODIMENTS

Figure 1:
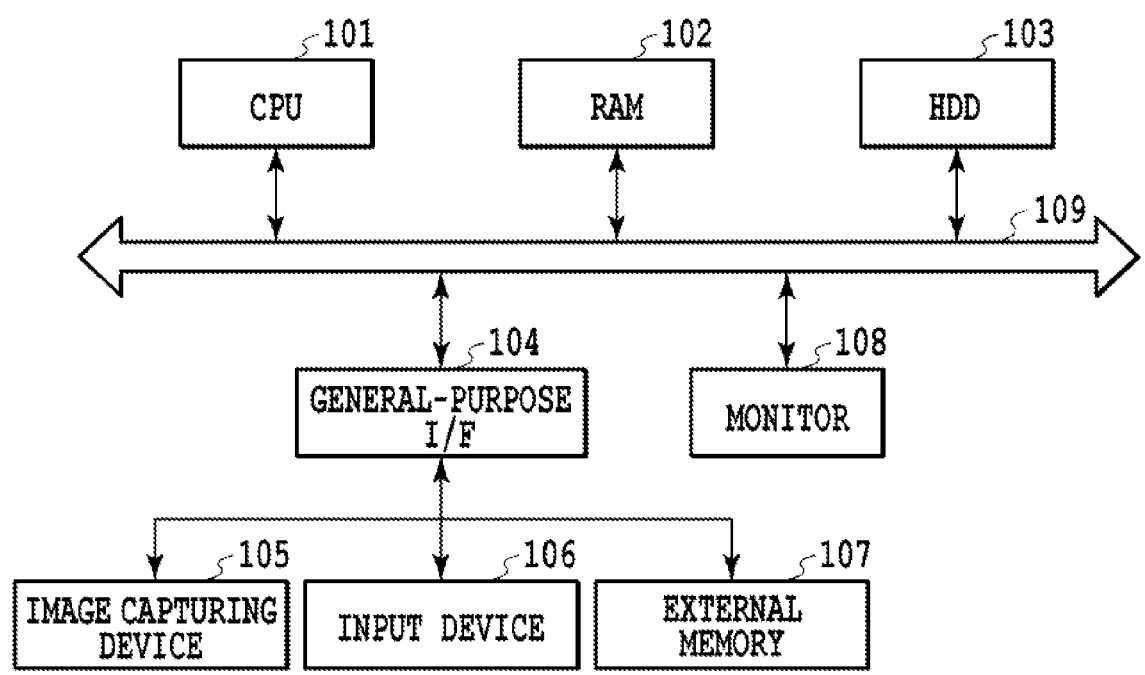
FIG. 1 is a block diagram showing an example of the hardware configuration of an image processing apparatus of an embodiment of the present invention.

Embodiments of the present invention are described below with reference to the drawings attached hereto. Note that configurations shown in the embodiments below are mere examples, and the present invention is not limited to the configurations shown in the drawings.

Embodiment 1

With reference to FIG. 1, an example of the hardware configuration of an image processing apparatus of this embodiment is described.

In FIG. 1, the image processing apparatus includes a CPU 101, a RAM 102, an HDD 103, a general-purpose interface (I/F) 104, a monitor 108, and a main bus 109. The general-purpose I/F 104 connects an image capturing device 105 such as a camera, an input device 106 such as a mouse and a keyboard, and an external memory 107 such as a memory card, to the main bus 109.

A description is given below of various kinds of processing implemented by the CPU 101 operating various types of software (computer programs) stored in the HDD 103.

First, the CPU 101 activates an image processing application stored in the HDD 103, deploys the application on the RAM 102, and displays a user interface (UI) on the monitor 108. Next, various types of data stored in the HDD 103 and the external memory 107, image data captured by the image capturing device 105, commands from the input device 106, and the like, are transferred to the RAM 102. Further, in accordance with processing in the image processing application, the data stored in the RAM 102 are subjected to various computations based on commands from the CPU 101. Results of the computations are displayed on the monitor 108 and/or stored in the HDD 103 or the external memory 107. Note that image data stored in the HDD 103 or the external memory 107 may be transferred to the RAM 102. Moreover, image data transmitted from a server via a network (not shown) may be transferred to the RAM 102.

A detailed description is given of processing, performed by the image processing apparatus having the above configuration based on commands from the CPU 101, for generating noise-reduced image data by inputting image data to the image processing application and reducing noise therein and for outputting the noise-reduced image data.

(Non-Local Means)

First, a description is given of noise reduction processing described in this embodiment. In this embodiment, a Non-local Means (NLM) method is used. In this method, noise is reduced by adaptively weighting pixel values of reference pixels around a target pixel, including the target pixel (noise reduction target), and replacing the pixel value of the target pixel with a weighted average of the pixel values of the reference pixels. A pixel value Inew of the target pixel obtained by the noise reduction processing using the weighted average is derived by the following formula.

$$I_{new} = \frac{\sum_{j=1}^{N_S} w_j \times I_j}{\sum_{j=1}^{N_S} w_j} \quad (1)$$

where Ns is the number of reference pixels, Ij (j=1 to $N_s$) is a pixel value of a reference pixel, and $w_j$ (j=1 to $N_s$) is a weight for a reference pixel.

Next, how to determine the weights for the reference pixels is described with reference to FIGS. 12A, 12B, and FIG. 13.

Figure 12A:
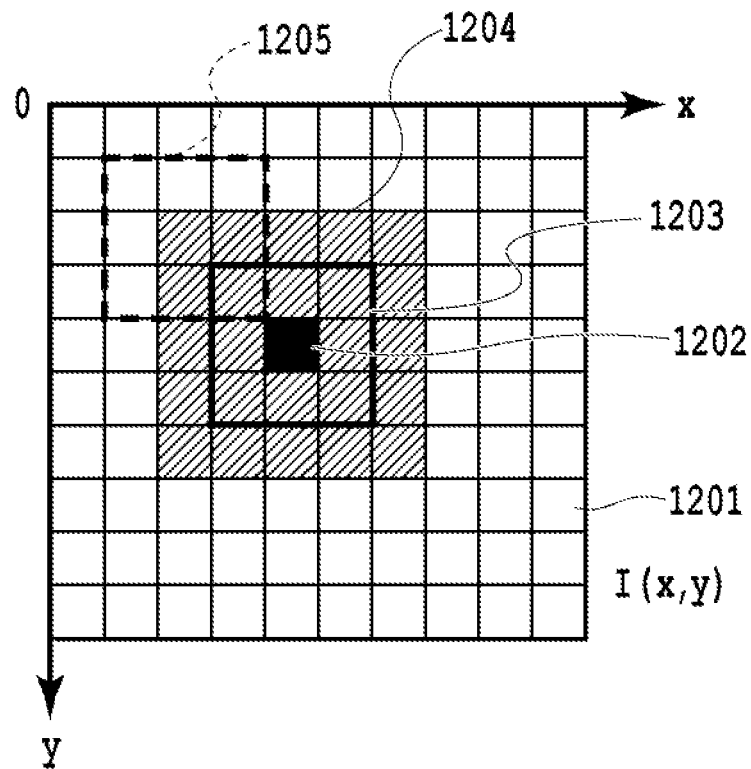
FIGS. 12A and 12B are schematic diagrams illustrating a noise reduction method in the embodiment of the present invention.
Figure 12B:
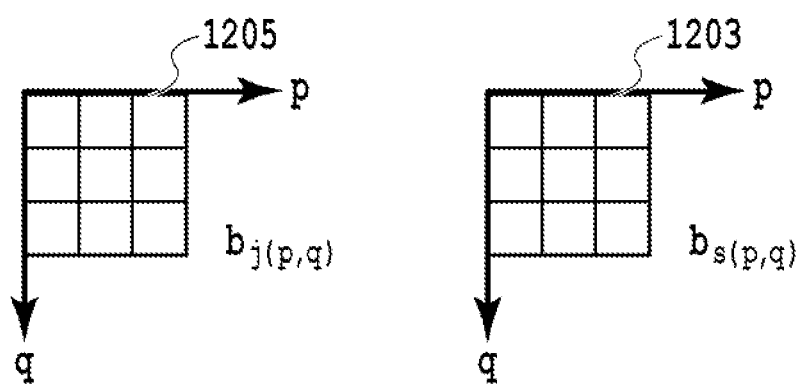
Figure 13:
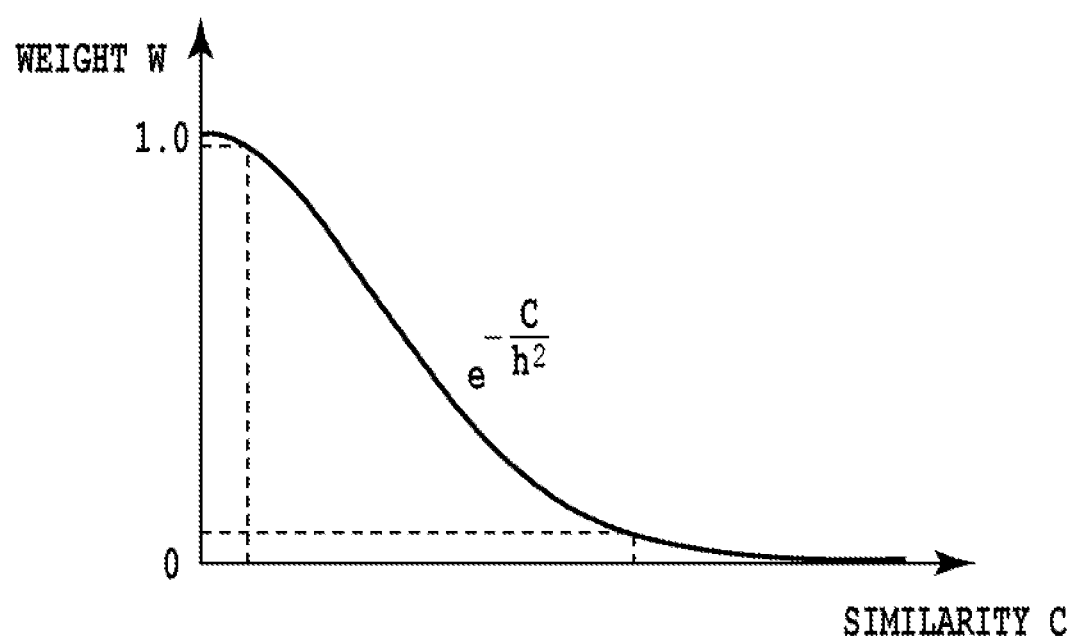
FIG. 13 is a schematic diagram illustrating a function for calculating a weight for a reference pixel in the embodiment of the present invention.

FIG. 12A shows image data 1201 as an example, in which a pixel value of each pixel is represented by I(x,y) with the upper left pixel being the origin. Reference numeral 1202 denotes a target pixel whose pixel value is I(4,4). Reference numeral 1203 is a target area that is a square having 3×3 pixels with the target pixel 1202 (noise reduction target) located at the center of the square. This 3×3-pixel square area can also be put as a target pixel group including the target pixel. Reference numeral 1204 denotes reference pixels that are in a square area of 5×5 pixels ($N_s$=25) including the target pixel 1202. Reference numeral 1205 is a reference area of a reference pixel I(2,2) and is a square area of 3×3 pixels having the reference pixel I(2,2) at its center and having the same size as the target area. This 3×3-pixel square area can also be put as a reference pixel group including the reference pixel. Although each reference pixel has its reference area, only the reference area of the reference pixel I(2,2) is shown in FIG. 12A.

To obtain a weight for the reference pixel I(2,2), first, the reference area 1205 of the reference pixel I(2,2) is compared with the target area 1203 to determine their similarity. Note that the similarity may be obtained by any desired method. For instance, as shown in FIG. 12B, each pixel in the target area 1203 is expressed as $b_s(p,q)$, and each pixel in the reference area 1205 is expressed as $b_j(p,q)$ (j=1 to $N_S$). Then, a difference between a pixel in the target area 1203 and a pixel in the reference area 1205, which pixels spatially correspond to each other, is obtained as a similarity $C_j$ by the following formula.

$$C_j = \sum_p \sum_q (b_j(p, q) - b_s(p, q))^2 \qquad (2)$$

The smaller the value of the similarity $C_j$ is, the higher the similarity is between the target area and the reference area. Thus, a weight is determined according to the similarity. As shown by a function in FIG. 13, the weight may be determined such that the lower the similarity $C_j$, the larger the weight and that the higher the similarity $C_j$, the smaller the weight. For example, the weight is determined by the following formula.

$$w_j = \exp\left(-\frac{C_j}{h^2}\right) \qquad (3)$$

In the above formula, h is a variable controlling the magnitude of the weight, and increasing h makes the noise reduction effect higher, but blurs the edge.

By sequentially comparing the target area 1203 with the reference area of each of the reference pixels, a weight for each of the reference pixels is obtained.

Note that the noise reduction processing in this embodiment only has to be processing by which the weight for each reference pixel is determined based on a similarity between the target area and the reference area of the reference pixel, and the similarity or weight determination methods are not limited to what is described herein.

Logical Configuration of the Image Processing Apparatus

Image processing in this embodiment is described below with reference to FIGS. 2 and 3.

Figure 2:
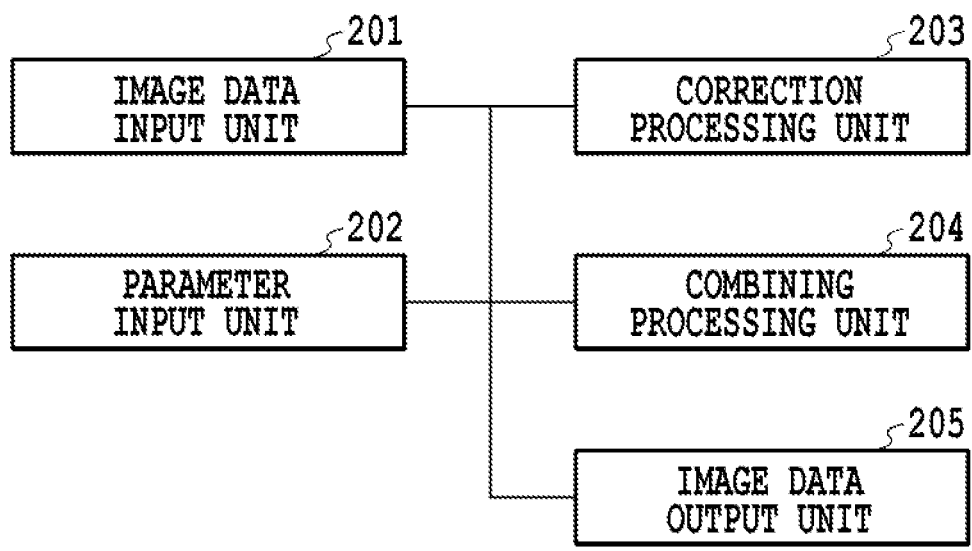
FIG. 2 is a block diagram showing an example of the logical configuration of an image processing apparatus of Embodiment 1 of the present invention.

FIG. 2 is a schematic diagram showing an example of the logical configuration of the image processing apparatus of this embodiment. In FIG. 2, the image processing apparatus has an image data input unit 201, a parameter input unit 202, a correction processing unit 203, a combining processing unit 204, and an image data output unit 205.

The image data input unit 201 is configured to input image data to the image processing apparatus. The image data is inputted from the image capturing device 105, the HDD 103, or the external memory 107 based on a command from the CPU 101. Image data captured by the image capturing device 105 and stored in a storage device, such as the HDD 103, may be inputted, of course.

The parameter input unit 202 is configured to input image processing parameters used for image processing to the image processing apparatus, the image processing parameters including multiple noise reduction processing parameters and a combining processing parameter. The parameters are inputted from the HDD 103 or the external memory 107 based on a command from the CPU 101. Alternatively, the parameters may be directly designated on the user interface (UI) by use of the input device 106, such as a keyboard and a mouse. The parameters will be described in detail later.

The correction processing unit 203 is configured to obtain, based on a command from the CPU 101, the image data inputted by the image data input unit 201 and the multiple noise reduction processing parameters inputted by the parameter input unit 202, and then generate multiple pieces of corrected image data based on the respective noise reduction processing parameters, as well as multiple correction parameters corresponding to each piece of the corrected image data. The multiple pieces of corrected image data and the multiple correction parameters are stored in the RAM 102. Details of the corrected image data and the correction parameters will be given later.

The combining processing unit 204 is configured to obtain, based on a command from the CPU 101, the multiple pieces of corrected image data and the multiple correction parameters generated by the correction processing unit 203 and stored in the RAM 102, as well as the combining processing parameter inputted by the parameter input unit 202, and then to generate combined image data based on the pieces of data obtained. The combined image data thus generated is stored in the RAM 102.

The image data output unit 205 is configured to output the combined image data generated by the combining processing unit 204 to the monitor 108, the HDD 103, and/or the like. Note that the output destination is not limited to the above, and the combined image data may be outputted to, for example, the external memory 107 connected to the general-purpose I/F 104, an external server (not shown), or a printer, or the like, additionally connected to the image processing apparatus.

(Main Processing Flow)

With reference to a flowchart in FIG. 3, details are given below of each processing performed in the logical configuration of the image processing apparatus described using FIG. 2.

In Step S301, the image data input unit 201 inputs image data.

In Step S302, the parameter input unit 202 inputs image processing parameters. The parameters inputted here include multiple noise reduction processing parameters for different target areas and a combining processing parameter. First, the noise reduction processing parameters are described. As described with Formulas (1) to (3), what are needed to obtain a noise-reduced pixel value are multiple reference pixels and a target area for determining a weight for each of the reference pixels. Determining the target area determines the reference area of each reference pixel. In this embodiment, each noise reduction processing parameter indicates multiple reference pixels and a target area. The target area is a parameter indicating which pixels in a certain area are used for a comparison between a certain designated target pixel and reference areas. Thus, a parameter indicating a target area can also be put as a pixel placement used as a target area or pixels used as a target area.

The reference pixels may be ones near the target pixel or ones on the entire image. In an example described below, the reference pixels are 5×5 pixels having a target pixel at their center. Generally, the more the reference pixels, the higher the noise reduction effect. However, using more reference pixels requires a longer processing time. Thus, the number of the reference pixels inputted as the noise reduction processing parameter may be determined according to a desired embodiment. On the other hand, as the target area, multiple target areas are inputted, each having a different number of pixels or a different pixel placement in a certain area. In other words, in this embodiment, multiple noise reduction processing parameters are inputted, and each of them indicates a different set of a target area and multiple reference pixels.

Figure 4A:
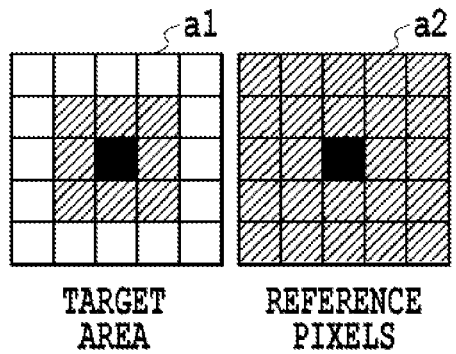
FIGS. 4A to 4F are schematic diagrams illustrating examples of noise reduction processing parameters in the embodiment of the present invention.
Figure 4B:
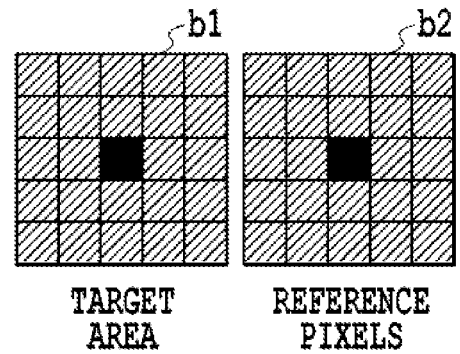
Figure 4C:
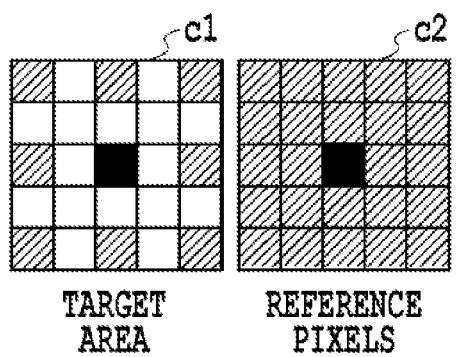
Figure 4D:
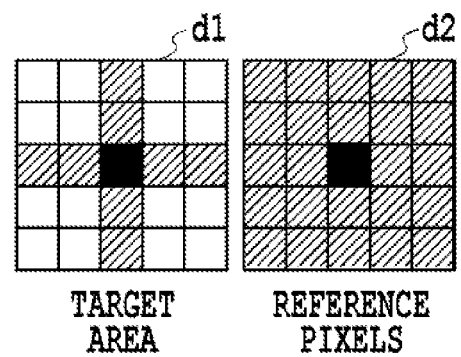

With reference to FIGS. 4A to 4F, examples of the target area are described. FIGS. 4A to 4F schematically show an example where there are multiple sets of a target area and multiple reference pixels, each set being designated as a noise reduction processing parameter. FIGS. 4A to 4F show that each parameter has a different positional relation among pixels of a target pixel group. In FIGS. 4A to 4F, pixels in black are target pixels. In each of FIGS. 4A to 4F, in a section named TARGET AREA, a pixel in black and shaded pixels constitute a target area, and in a section named REFERENCE PIXEL, a pixel in black and shaded pixels are reference pixels. The sets shown respectively in FIGS. 4A to 4F are examples of the noise reduction processing parameters. FIG. 4A shows a target area a1 of 3×3 pixels, and FIG. 4B shows a target area b1 of 5×5 pixels. The target area a1 in FIG. 4A and the target area b1 in FIG. 4B have different numbers of pixels. In addition, FIG. 4C shows a target area c1 of 3×3 pixels at positions away from the target pixel by one pixel. FIG. 4D shows a target area d1 having five pixels longitudinally and five pixels laterally with the target pixel at the center. The target area a1 in FIG. 4A, the target area c1 in FIG. 4C, and the target area d1 in FIG. 4D have the same number of pixels, but each have a different pixel placement in the target area. In this way, multiple target areas different in the number of pixels or in the pixel placement may be inputted as the noise reduction processing parameters. By thus inputting multiple noise reduction processing parameters respectively indicating different target areas, an area containing edges and a smooth area, for example, can be subjected to different types of noise reduction processing according to the different target areas.

Figure 4E:
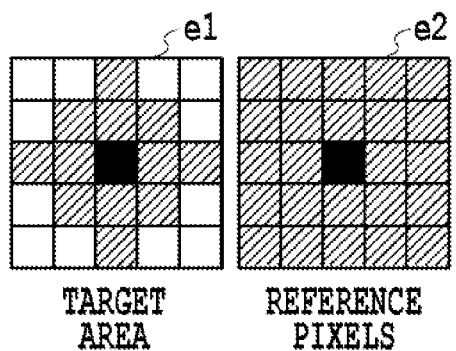
Figure 4F:
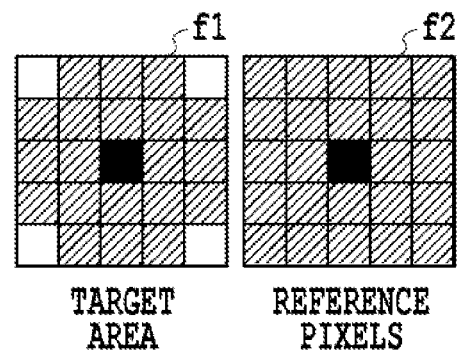

Note that the pixel placements of the target areas are not limited to what are described above, and may be any desired placements. For example, FIG. 4E shows a target area e1 in which each pixel has a Manhattan distance of two or less from the target pixel. FIG. 4F shows a target area f2 in which each pixel has a Euclidean distance of √5 or less from the target pixel. Such target areas having different distances from the target pixels may be inputted as the noise reduction processing parameters, as well. Although the ranges of the target areas and reference pixels are square for convenience in FIGS. 4A to 4F, the present invention is not limited to this, and the ranges may be other shapes, such as a rectangle.

The combining processing parameter is described next. The combining processing parameter indicates, for example, thresholds corresponding to correction parameters generated by the correction processing unit 203 or a combining ratio for combining multiple pieces of corrected image data. The correction parameters are each a parameter showing the degree of noise reduction effect. Details will be provided later.

The following describes a case when the image processing parameters inputted include three noise reduction processing parameters, indicating three different target areas and a combining processing parameter, indicating two thresholds $E_{th}1$ and $E_{th}2$ corresponding to the correction parameters.

In Step S303, the correction processing unit 203 refers to the multiple noise reduction processing parameters inputted in Step S302, and generates, from the image data inputted in Step S301, multiple pieces of corrected image data and multiple correction parameters. Details of a method for generating the pieces of corrected image data and the correction parameters will be given later.

In Step S304, based on the combining processing parameter inputted in Step S302 and the multiple correction parameters generated in Step S303, the combining processing unit 204 combines the multiple pieces of corrected image data generated in Step S303 and thus generates combined image data. Details of a method for generating the combined image data will be given later.

In Step S305, the image data output unit 205 outputs the combined image data generated in Step S304.

(Correction Processing)

Figure 3:
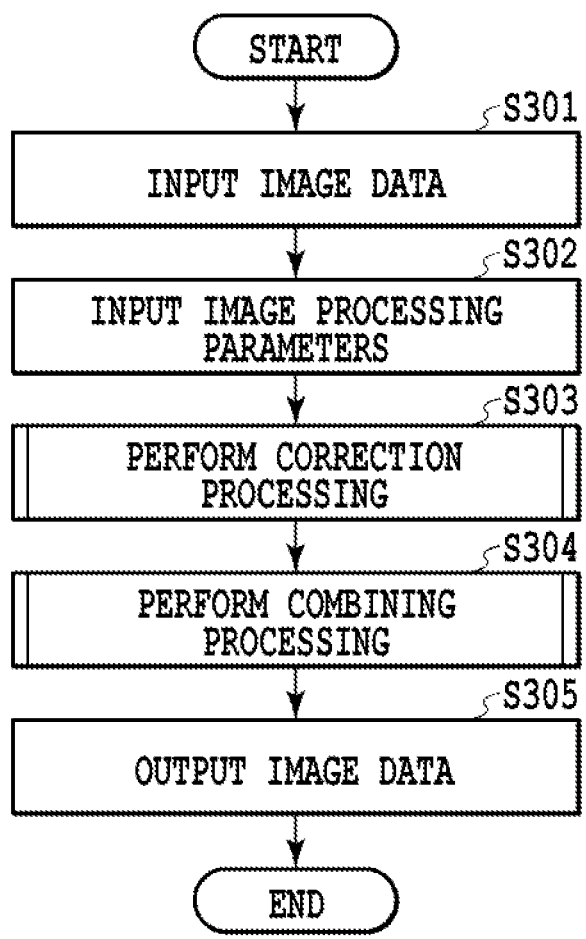
FIG. 3 is a flowchart diagram showing an example of a flow of image processing in Embodiment 1 of the present invention.
Figure 5:
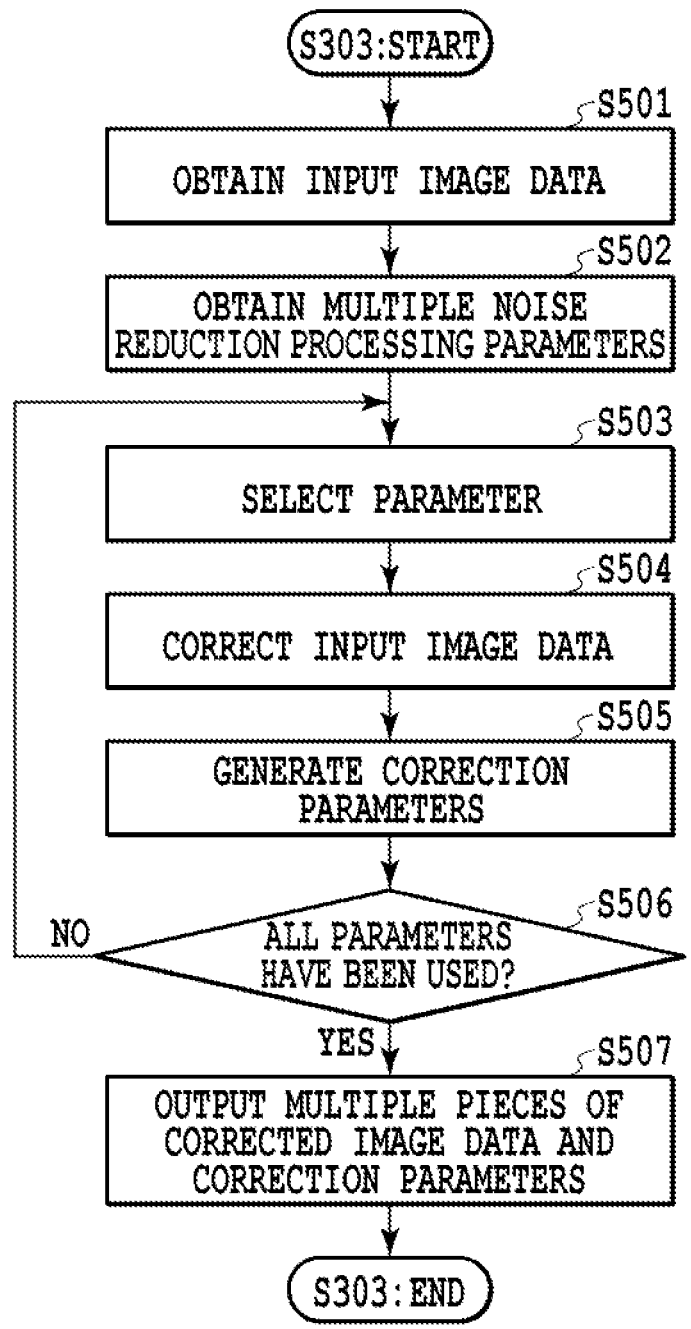
FIG. 5 is a flowchart diagram showing an example of a flow of noise reduction processing in Embodiment 1 of the present invention.

With reference to a flowchart in FIG. 5, the correction processing in Step S303 of FIG. 3 is described in detail below.

In Step S501, the correction processing unit 203 obtains image data inputted in Step S301.

In Step S502, the correction processing unit 203 obtains the multiple noise reduction processing parameters inputted in Step S302.

In Step S503, the correction processing unit 203 selects one noise reduction processing parameter from the multiple noise reduction processing parameters obtained in Step S502. For example, the correction processing unit 203 selects a noise reduction processing parameter including, as described above, multiple reference pixels and a target area.

In Step S504, the correction processing unit 203 corrects the image data obtained in Step S501 by using the noise reduction processing parameter selected in Step S503, and thereby generates a piece of corrected image data. Specifically, Formulas (1) to (3) may be applied sequentially to each pixel.

In Step S505, the correction processing unit 203 generates a correction parameter for each pixel. A correction parameter $E_i$ for each pixel is obtained by the following formula using a ratio of the sum of the weights $w_j$ calculated by Formula (3) to the square sum thereof.

$$E_i = \frac{\sum_{j=1}^{N_s} w_j^2}{\left\{\sum_{j=1}^{N_s} w_j\right\}^2} \quad (4)$$

A smaller correction parameter $E_i$ indicates a higher noise reduction effect, and a larger correction parameter $E_i$ indicates a lower noise reduction effect. For example, $E_i$ equals 1 in a case when noise cannot be reduced, i.e., the weights for the reference pixels other than the target pixel are zero, and $E_i$ becomes less than 1 as the weights for the reference pixels other than the target pixel increase. On the other hand, $E_i$ equals 1/Ns in a case when there is no noise, i.e., all the reference pixels have the same weight. A larger correction parameter $E_i$ can also indicate a higher possibility that the target pixel is an edge. For example, the correction parameter $E_i$ is large for an area such as an edge portion that includes a reference pixel the weight for which is zero, and is small for an area such as a smooth portion that includes many pixels having similar weights. Note that the present invention is not limited to such a correction parameter, as long as it indicates a noise reduction effect. For example, a difference between a pixel value before correction and a pixel value after correction, the number of reference pixels the weight for which is not zero, and the like, can be used as the correction parameter.

In Step S506, the correction processing unit 203 determines whether or not the correction processing has been completed for all of the noise reduction processing parameters obtained in Step S502. The correction processing unit 203 proceeds to Step S507 in a case when it is determined that the correction processing has been completed, or proceeds to Step S503 to continue the processing by selecting an unprocessed parameter in a case when it is determined that the correction processing has not been completed yet.

In Step S507, the correction processing unit 203 outputs multiple pieces of corrected image data and the multiple correction parameters generated in Step S504 and Step S505.

(Combining Processing)

Figure 6:
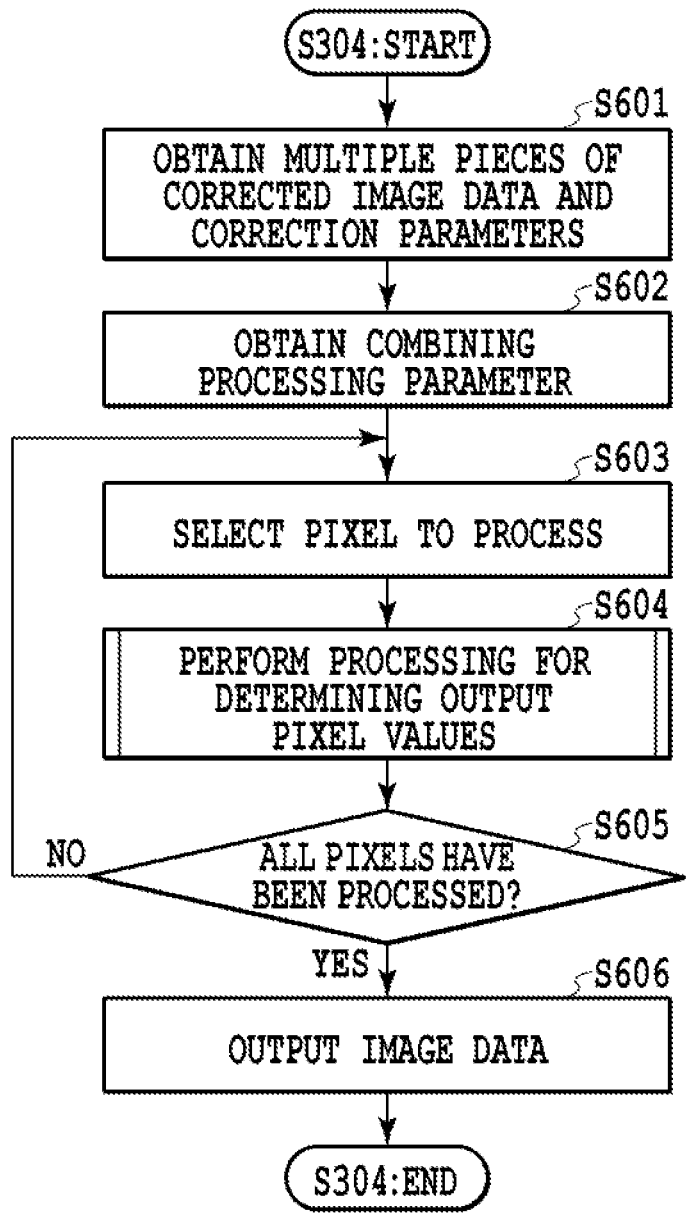
FIG. 6 is a flowchart diagram showing an example of a flow of combining processing in Embodiment 1 of the present invention.

With reference to flowcharts in FIGS. 6 and 7, the combining processing in Step S304 of FIG. 3 is described in detail below.

In Step S601, the combining processing unit 204 obtains the multiple pieces of corrected image data and the multiple correction parameters generated in Step S303.

In Step S602, the combining processing unit 204 obtains the combining processing parameter inputted in Step S302.

In Step S603, the combining processing unit 204 selects any corresponding unprocessed pixels of the respective pieces of corrected image data obtained in Step S601. Alternatively, the combining processing unit 204 may select an unprocessed pixel of the image data inputted in Step S301.

In Step S604, based on the multiple pieces of corrected image data and the multiple correction parameters obtained in Step S601 and the combining processing parameter obtained in Step S602, the combining processing unit 204 determines an output pixel value of the pixels selected in Step S603.

Figure 7:
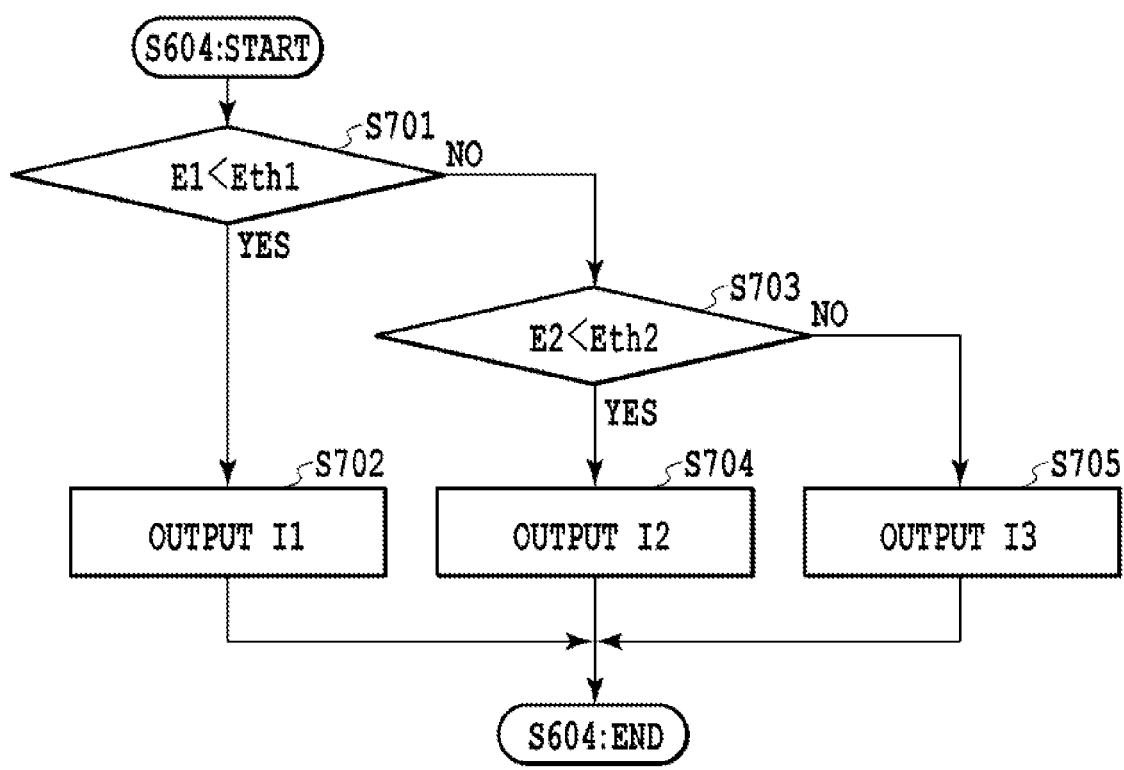
FIG. 7 is a flowchart diagram showing an example of a flow of processing for determining output pixel values in Embodiment 1 of the present invention.

Here, with reference to a flowchart in FIG. 7, a description is given of a method of combining three pieces of corrected image data. Pixel values of the pixels, selected in Step S603, of the three pieces of corrected image data are denoted as I1, I2, and I3, respectively, and the correction parameters for those pixels are denoted as E1, E2, and E3, respectively. In addition, the thresholds obtained in Step S602 as the combining processing parameter are denoted as Eth1 and Eth2. As described earlier, the lesser the correction parameter, the higher the noise reduction effect, and the greater the correction parameter, the lower the noise reduction effect.

In Step S701, the combining processing unit 204 compares the correction parameter E1 with the threshold $E_{th}1$. In a case when the correction parameter E1 is smaller than the threshold $E_{th}1$, i.e., when the noise reduction effect is higher than the value instructed with the threshold, the combining processing unit 204 proceeds to Step S702 to output the pixel value I1. The combining processing unit 204 proceeds to Step S703 in a case when the correction parameter E1 is equal to or larger than the threshold $E_{th}1$, i.e., when the noise reduction effect is lower than the value instructed with the threshold. The combining processing unit 204 similarly compares the correction parameter E2 with the threshold $E_{th}2$ in Step S703, and in a case when the correction parameter E2 is smaller than the threshold $E_{th}2$, proceeds to Step S704 to output the pixel value I2. On the other hand, in a case when the correction parameter E2 is equal to or larger than the threshold $E_{th}2$, the combining processing unit 204 proceeds to Step S705 to output the pixel value I3. In this combining method, however, a pixel having a higher noise reduction effect than the desired threshold obtained in Step S602 is not always selected. For example, suppose a case when the correction parameter E2 is a value smaller than the correction parameter E1. Then, in a case when it is determined in Step S701 that the correction parameter E1 is smaller than the threshold $E_{th}1$, the pixel I2 that corresponds to the correction parameter E2 having a higher noise reduction effect is not outputted. Thus, the combining processing can be performed so that a corrected image generated based on a noise reduction processing parameter indicating many pixels in the target area or having a large target area can be preferentially outputted. For example, in a case when the three parameters in FIGS. 4A, 4B, and 4C are used, I1, I2, and I3 can correspond to results processed in FIGS. 4B, 4C, and 4A, respectively.

A desired method may be used to determine the output pixel values according to a combining command included in the combining processing parameter. For example, the combining processing unit 204 may compare all of the correction parameters E1, E2, and E3 selected in Step S602 and use, as the output pixel value, a pixel value of the corrected image data having the smallest correction parameter, i.e., having a highest noise reduction effect. Further, instead of selecting the output pixel value, the combining processing unit 204 may also use, as the output pixel value, the sum of the pixel values of the respective pieces of corrected image data that are weighted based on the combining ratio according to the degrees of noise reduction effect indicated by the correction parameters. It goes without saying that the parameters necessary to obtain these output pixel values may be obtained in Step S602 as the combining processing parameter. Further, although three pieces of corrected image data are combined in this embodiment, the number of pieces of corrected image data is not limited, as long as it is two or more.

In Step S605, the combining processing unit 204 determines whether or not the output pixel value has been determined for every pixel. The combining processing unit 204 proceeds to Step S606 in a case when the output pixel value has been determined for every pixel, or proceeds to Step S603 to continue the processing in a case when the output pixel value has not been determined for every pixel yet.

In Step S606, the combining processing unit 204 outputs combined image data thus generated.

By the processing above, even image data including both of an area containing edges and a smooth area can be reduced in noise for both of the areas. Thus, compared to a result of noise reduction processing that applies a common target area, high-quality image data reduced in noise can be generated, irrespective of a captured object recorded in the image data.

Embodiment 2

In a method described in Embodiment 1, output image data is generated by generating multiple pieces of corrected image data and correction parameters based on multiple noise reduction processing parameters, and then combining the multiple pieces of correction data. This method refers to many pieces of data to achieve flexible selection of the combining method, but on the other hand, needs to retain the multiple pieces of corrected image data and correction parameters, thus requiring a lot of memory. Thus, in this embodiment, an image is generated by performing processing on a pixel basis to decrease memory usage. Note that the hardware configuration of an image processing apparatus of Embodiment 2 can be the same as that described in Embodiment 1, and is, therefore, not described again here.

Figure 8:
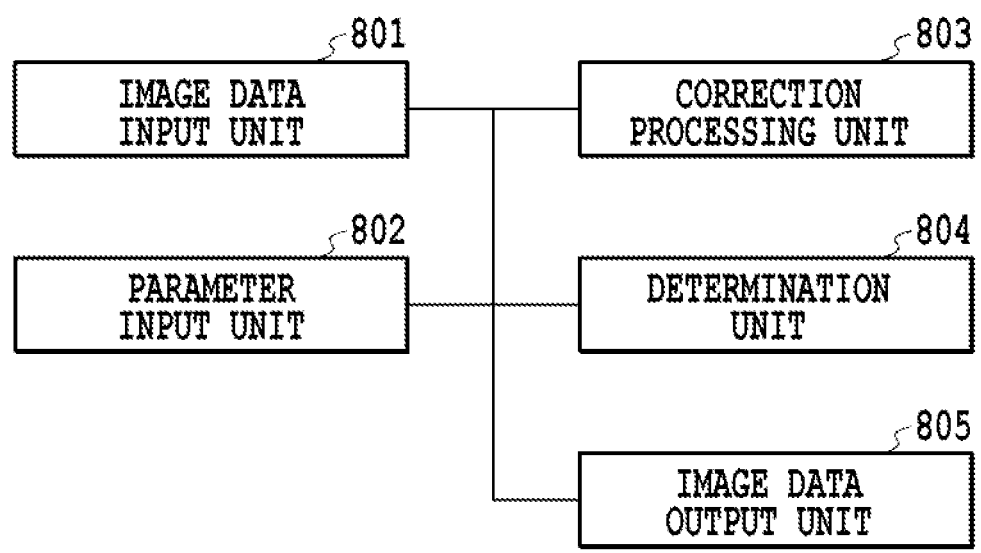
FIG. 8 is a block diagram showing an example of the logical configuration of an image processing apparatus of Embodiment 2 of the present invention.

FIG. 8 is a schematic diagram showing an example of the logical configuration of the image processing apparatus of this embodiment. The image processing apparatus of this embodiment includes an image data input unit 801, a parameter input unit 802, a correction processing unit 803, a determination unit 804, and an image data output unit 805.

The image data input unit 801 is the same as the image data input unit 201.

The parameter input unit 802 is configured to input, to the image processing apparatus, multiple noise reduction processing parameters and a determination processing parameter used for image processing. These parameters are inputted from the HDD 103 or the external memory 107, based on a command from the CPU 101. Alternatively, the parameters may be directly designated on the user interface (UI) by use of the input device 106, such as a keyboard and mouse. The parameters will be described in detail later.

The correction processing unit 803 is configured, based on a command from the CPU 101, to obtain the image data inputted by the image data input unit 801 and the parameters inputted by the parameter input unit 802, and to generate a correction value and a correction parameter for each pixel. The correction values and correction parameters thus generated are stored in the RAM 102.

The determination unit 804 is configured, based on a command from the CPU 101, to obtain the correction value and correction parameter for each pixel generated by the correction processing unit 203 and the determination processing parameter inputted by the parameter input unit 802, and then to determine, based on the correction parameter and the determination parameter, whether or not to output the correction value.

The image data output unit 805 outputs image data generated based on the correction values generated by the correction processing unit 203 and results of the determination by the determination unit 804, to the monitor 108, the HDD 103, and/or the like. Note that the output destination is not limited to the above, and the image data may be outputted, for example, to the external memory 107 connected to the general-purpose I/F 104.

Figure 9:
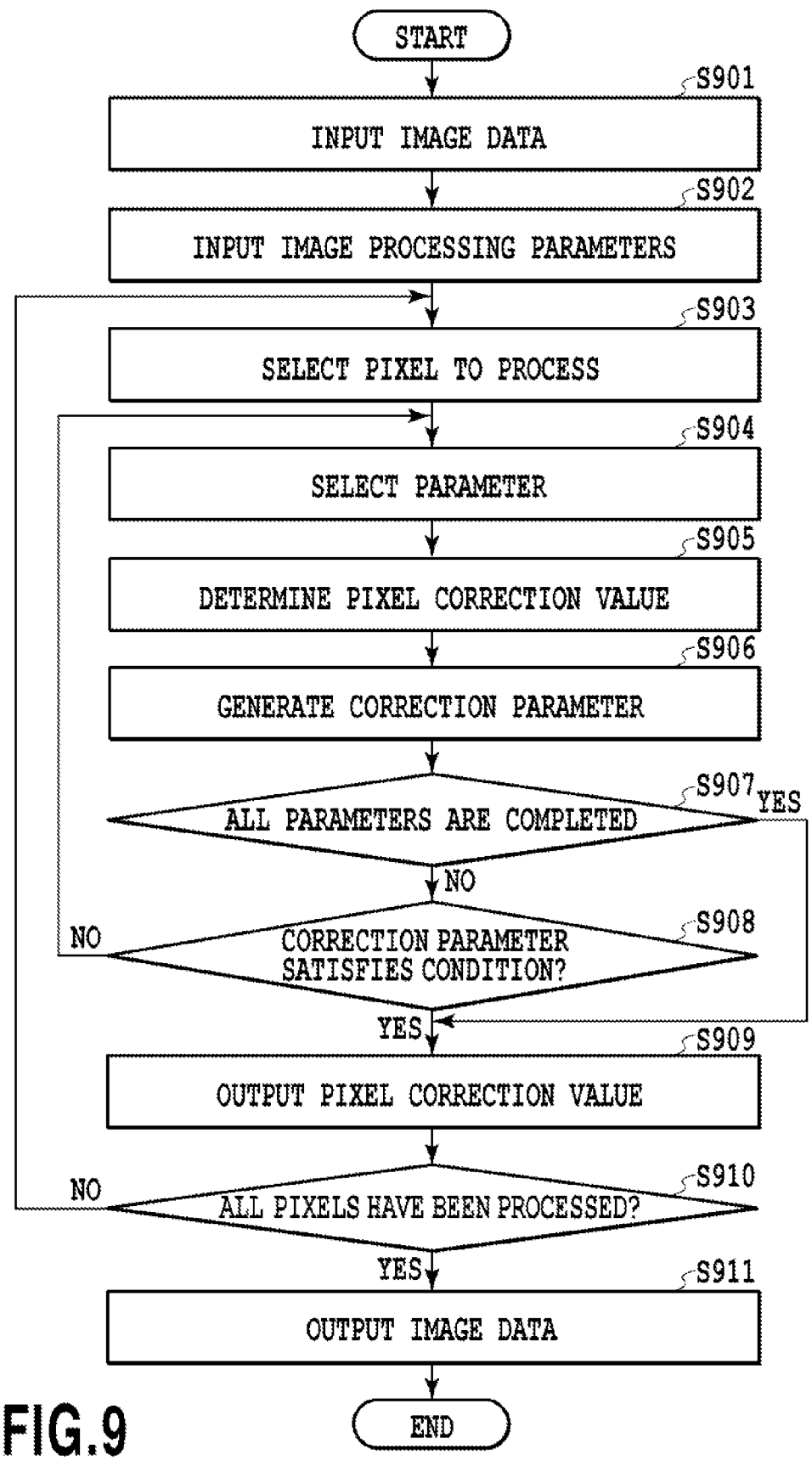
FIG. 9 is a flowchart diagram showing an example of a flow of image processing in Embodiment 2 of the present invention.

With reference to a flowchart in FIG. 9, details are given below of each processing performed in the logical configuration of the image processing apparatus described using FIG. 8.

In Step S901, the image data input unit 801 inputs image data.

In Step S902, the parameter input unit 802 inputs image processing parameters. The parameters inputted here are multiple noise reduction processing parameters for different target areas and a determination processing parameter. In this embodiment, the parameters inputted are, as an example, three noise reduction processing parameters having different target areas and, as the determination processing parameter, two thresholds Eth1 and Eth2 corresponding to the correction parameters.

In Step S903, the correction processing unit 803 selects an unprocessed pixel from the image data inputted in Step S901.

In Step S904, the correction processing unit 803 selects one of the multiple noise reduction processing parameters inputted in Step S902. As described in Embodiment 1, it is preferable that a parameter having many pixels in the target area or having a large target area is preferentially selected.

In Step S905, the correction processing unit 803 determines a correction value for the pixel selected in Step S901. The correction value is determined in the same way as in Step S504, and Formulas (1) to (3) may be applied based on the noise reduction processing parameter selected in Step S904.

In Step S906, based on a result of the processing in Step S905, the correction processing unit 803 generates a correction parameter for the pixel selected in Step S901. The correction parameter is generated in the same way as in Step S505, and a correction parameter Ei may be generated by use of Formula (4).

In Step S907, the determination unit 804 determines whether or not the noise reduction processing parameters inputted in Step S902 have all been used. In this embodiment, the determination unit 804 determines whether or not the three noise reduction processing parameters inputted in Step S902 have all been used for the pixel selected in Step 903. The determination unit 804 proceeds to Step S909 in a case when it determines that all the parameters have been used, or proceeds to Step S908 in a case when not all of the parameters have been used.

In Step S908, the determination unit 804 determines whether the correction parameter generated in Step S906 satisfies a condition determined by the determination processing parameter inputted in Step S902, or not. For example, the determination unit 804 determines whether E1 Eth1 or not, where E1 is the correction parameter generated in Step S905, and Eth1 is a corresponding threshold (determination processing parameter) inputted in Step S902. The determination unit 804 proceeds to Step S909 in a case when the condition is satisfied, or proceeds to Step S904 to cause the correction processing unit 803 to select a different one of the noise reduction processing parameters in a case when the condition is not satisfied.

In Step S909, the correction processing unit 803 outputs the correction value determined in Step S905 as a correction value for the pixel selected in Step S903.

In Step S910, the correction processing unit 803 determines whether or not the processing has been completed for all of the pixels of the image data inputted in Step S901. The correction processing unit 803 proceeds to Step S911 in a case when the processing has been completed for all of the pixels, or proceeds to Step S903 to continue the processing in a case when the processing has not been completed for all of the pixels yet.

In Step S911, the image data output unit 905 outputs the corrected image data.

By the processing above, a correction value and a correction parameter are generated for each pixel, and it can be determined based on the correction parameter whether or not to use the correction value as an output value. Thus, there is no need to retain pieces of corrected image data and correction parameters in the memory. For this reason, corrected image data, to which multiple different noise reduction processing parameters have been applied, can be generated with less memory consumption.

Embodiment 3

In Embodiments 1 and 2, output image data is generated by first performing the noise reduction processing and then combining pieces of corrected image data based on correction parameters or making determination based on correction parameters. Incidentally, in a case when an area containing edges and a smooth area can be discriminated from each other based on input image data, high-quality image data uniformly reduced in noise can be generated by applying different noise reduction processing parameters to the respective areas, even without using the correction parameters. Thus, in a method described in this embodiment, output image data is generated by dividing an input image into areas based on their attributes, and applying different noise reduction processing parameters to the areas.

Figure 10:
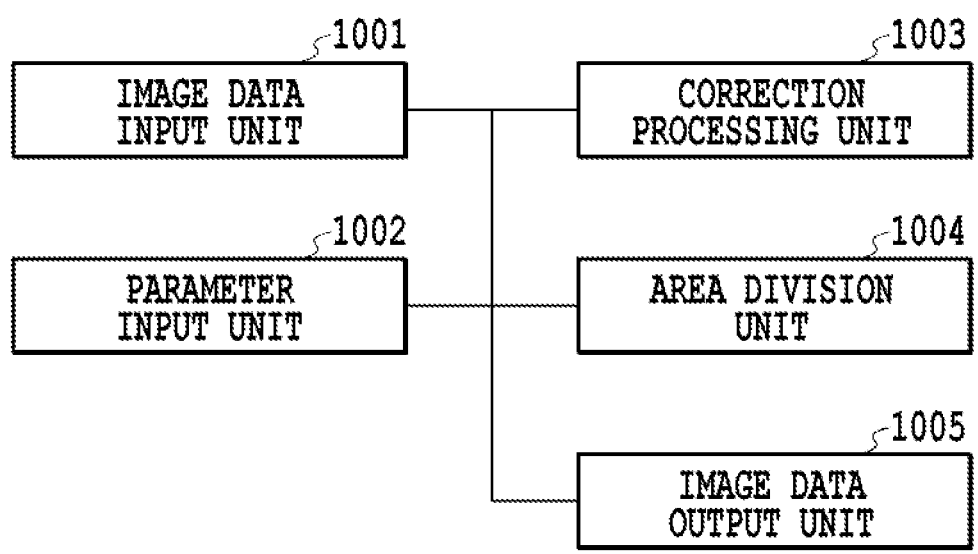
FIG. 10 is a block diagram showing an example of the logical configuration of an image processing apparatus of Embodiment 3 of the present invention.

FIG. 10 is a schematic diagram showing the logical configuration of an image processing apparatus of this embodiment. The image processing apparatus of this embodiment has an image data input unit 1001, a parameter input unit 1002, a correction processing unit 1003, an area division unit 1004, and an image data output unit 1005.

The image data input unit 1001 is the same as the image data input unit 201.

The parameter input unit 1002 is configured to input, to the image processing apparatus, multiple noise reduction processing parameters and an area division processing parameter as image processing parameters used for image processing. These parameters are inputted from the HDD 103 or the external memory 107 based on a command from the CPU 101. Alternatively, the parameters may be directly designated on the user interface (UI) by use of the input device 106, such as a keyboard and a mouse. The parameters will be described in detail later.

The correction processing unit 1003 is configured to obtain, based on commands from the CPU 101, the image data inputted by the image data input unit 1001, the multiple noise reduction processing parameters inputted by the parameter input unit 1002, and area-divided data generated by the area division unit 1004, and then to generate corrected image data. The corrected image data thus generated is stored in the RAM 102.

The area division unit 1004 is configured to obtain, based on commands from the CPU 101, the image data inputted by the image data input unit 1001 and the area division processing parameter inputted by the parameter input unit 1002, and to divide the image data into multiple areas. A method for the area division will be described in detail later. The area-divided data thus generated is stored in the RAM 102.

The image data output unit 1005 is configured to output the corrected image data generated by the correction processing unit 203 to the monitor 108, the HDD 103, and/or the like. Note that the output destination is not limited to the above, and the image data may be outputted to, for example, the external memory 107 connected to the general-purpose I/F 104.

Figure 11:
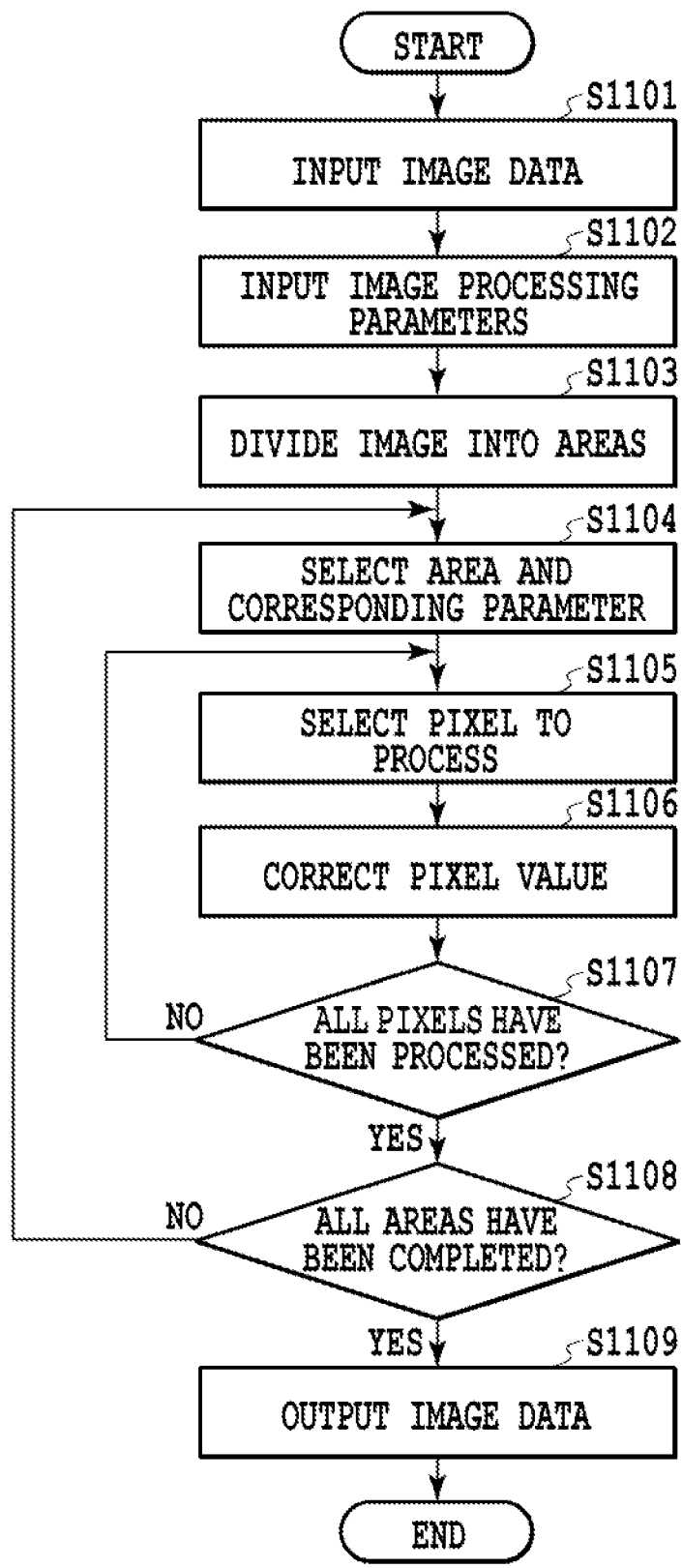
FIG. 11 is a flowchart diagram showing an example of a flow of image processing in Embodiment 3 of the present invention.

With reference to a flowchart in FIG. 11, details are given below of each processing performed in the logical configuration of the image processing apparatus described using FIG. 10. The following describes points different from those in FIG. 3 in Embodiment 1, omitting overlapping points.

In Step S1101, the image data input unit 1001 inputs image data.

In Step S1102, the parameter input unit 1002 inputs image processing parameters. The parameters inputted here include multiple noise reduction processing parameters, each having a different target area, and an area division processing parameter. As an example, in this embodiment, two noise reduction processing parameters having different target areas are inputted, and a threshold for an edge area and a threshold for a smooth area are inputted as the area division processing parameter.

In Step S1103, the area division unit 1004 divides an image indicated by the image data inputted in Step S1001 into areas. Here, the input image is divided into at least two types of areas: the edge area and the smooth area. The area division may be performed by a general edge detection method. For example, the image is divided into areas by applying a Sobel filter, a Laplacian filter, or the like, to the image, and using the thresholds inputted in Step S1102 as the area division processing parameter. The number of types of areas divided is, of course, not limited to two, but may be three or more. In this way, the areas divided based on attributes are determined by information determined based on frequency components.

Note that this embodiment is applicable, irrespective of the number of divided areas, as long as an output image can be generated by use of two or more different noise reduction processing parameters. For example, the image may be more finely classified on a captured object basis by use of an object detection method, or the like.

In Step S1104, the correction processing unit 1003 selects one of the multiple areas obtained by the division in Step S1103 and a noise reduction processing parameter corresponding to the selected area. Here, a noise reduction processing parameter applied to the edge area is one having a few pixels in the target area or having a small target area. On the other hand, a noise reduction processing parameter applied to areas other than the edge area, e.g., the smooth area, is preferably one having many pixels in the target area or having a large target area. To be more specific, it is preferable to use a first target area for each pixel in the edge area in the image and to use a second target area, which is larger than the first target area, to each pixel in areas in the image other than the edge area.

In Step S1105, the correction processing unit 1003 selects an unprocessed pixel in the area selected in Step S1104.

In Step S1106, the correction processing unit 1003 calculates a correction value of the pixel selected in Step S1105 by using the noise reduction processing parameter corresponding to the area selected in Step S1104. The method of calculating the correction value is the same as that in Step S504, and Formulas (1) to (3) may be applied based on the parameter selected in Step S1104.

In Step S1107, the correction processing unit 1003 determines whether or not the pixel-value correction has been completed for all of the pixels in the area selected in Step S1104. The correction processing unit 1003 proceeds to Step S1106 in a case when the correction has been completed for all of the pixels, or proceeds to Step S1105 to continue the processing in a case when the correction has not been completed for all of the pixels yet.

In Step S1108, the correction processing unit 1003 determines whether or not the processing has been completed for all of the areas obtained by the division in Step S1103. The correction processing unit 1003 proceeds to Step S1109 in a case when the processing has been completed for all of the areas, or proceeds to Step S1104 to continue the processing in a case when the processing has not been completed for all of the areas yet.

In Step S1109, the image data output unit 1005 outputs corrected image data.

With the processing above, it is possible to divide an input image into multiple areas and to apply noise reduction processing parameters to the areas, each noise reduction processing parameter being different on an area basis. Thus, high-quality image data uniformly reduced in noise can be generated, irrespective of a captured object recorded in the image data. Although the Non-local Means method is applied to each divided area by using a different parameter in this embodiment, a noise reduction method different for each area may be used. For example, it is possible to use the Non-local Means only for the edge area, and to use a mean filter for the smooth area.

Embodiment 4

In Embodiments 1 to 3, output image data is generated by combining pieces of corrected image data, each generated optimally for each area by performing the noise reduction processing on input image data based on multiple noise reduction processing parameters. However, without preparing the multiple noise reduction processing parameters, a similar effect can still be obtained by scaling an input image. In other words, it is possible to obtain effects similar to those described in Embodiments 1 to 3 by performing noise reduction processing on images obtained by scaling an input image by use of a common noise reduction processing parameter. To this end, the resolution of an input image is converted, and thereby, resolution-converted images are prepared. Specifically, in this embodiment, the size of an input image is scaled down in stages, and noise reduction processing is applied to each of the images thus prepared. Thereby, optimal output pixel values can be determined among corresponding areas of the input images of different sizes. In a method described in this embodiment below, pieces of image data are thus generated and then combined to generate output image data. Note that the hardware configuration of the image processing apparatus of Embodiment 4 is the same as that described in Embodiment 1, and is, therefore, not described again here.

Figure 14:
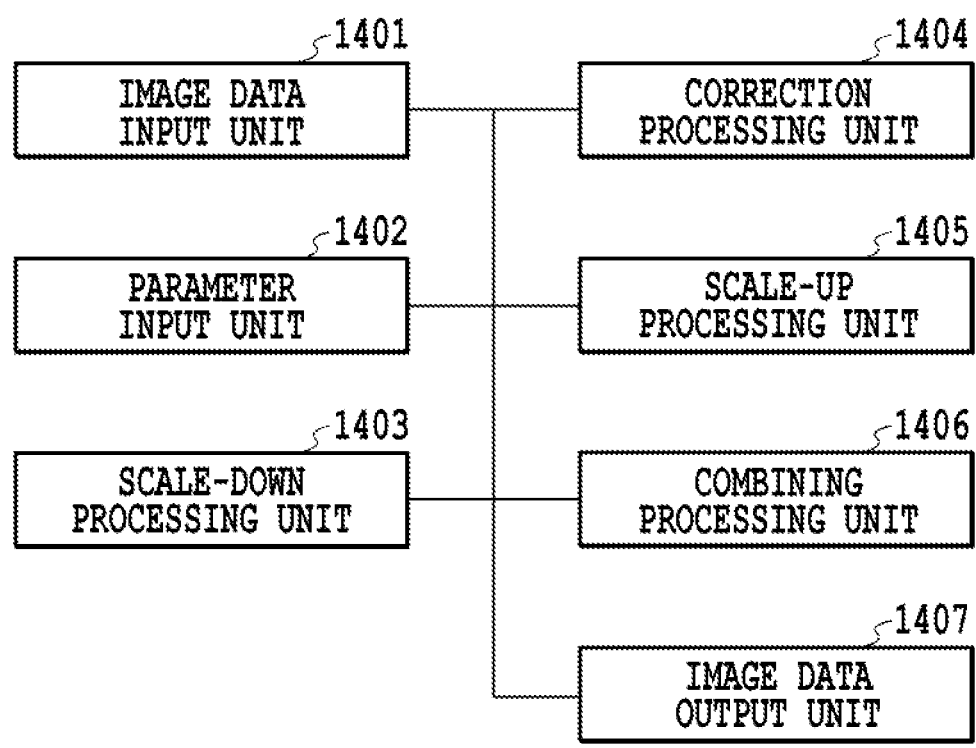
FIG. 14 is a block diagram showing an example of the logical configuration of an image processing apparatus of Embodiment 4 of the present invention.

FIG. 14 is a schematic diagram showing an example of the logical configuration of an image processing apparatus of this embodiment. The image processing apparatus in FIG. 14 includes an image data input unit 1401, a parameter input unit 1402, a scale-down processing unit 1403, a correction processing unit 1404, a scale-up processing unit 1405, a combining processing unit 1406, and an image data output unit 1407.

The image data input unit 1401 is the same as the image data input unit 201.

The parameter input unit 1402 is configured to input, to the image processing apparatus, parameters used for image processing, namely, a noise reduction processing parameter, a scale-down processing parameter indicating a scale-down condition, and a combining processing parameter. Each parameter is inputted from the HDD 103 or the external memory 107, based on a command from the CPU 101. Alternatively, the parameters may be directly designated on the user interface (UI) by use of the input device 106, such as a keyboard and a mouse. In this embodiment, the noise reduction processing parameter does not need to be multiple noise reduction processing parameters, as described in Embodiments 1 to 3. Details of the scale-down processing parameter will be given later.

The scale-down processing unit 1403 is configured, based on a command from the CPU 101, to obtain image data inputted by the image data input unit 1401 and the scale-down processing parameter inputted by the parameter input unit 1402, and then to generate pieces of scaled-down image data, each indicating a scaled-down image of the input image. The scaled-down image data thus generated are stored in the RAM 102. Details of the scale-down processing will be given later.

The correction processing unit 1404 is configured to obtain, based on a command from the CPU 101, the image data inputted by the image data input unit 1401, the pieces of scaled-down image data generated by the scale-down processing unit 1403, and the noise reduction processing parameter inputted by the parameter input unit 1402, and then to generate, for each piece of the scaled-down image data, corrected image data and correction parameters corresponding to the corrected image data. More specifically, the correction processing unit 1404 generates corrected image data and correction parameters for each of the images of different sizes. The multiple pieces of corrected image data and the multiple correction parameters are stored in the RAM 102.

The scale-up processing unit 1405 is configured, based on a command from the CPU 101, to generate pieces of scaled-up image data, each indicating a scaled-up image obtained by scaling up a corresponding piece of the corrected image data generated by the correction processing unit 1404, back to the original size of the input image data.

The combining processing unit 1406 is configured to obtain, based on a command from the CPU 101, multiple pieces of the scaled-up image data corresponding to the respective pieces of corrected image data and being generated by the scale-up processing unit 1405, the multiple correction parameters, and the combining processing parameter inputted by the parameter input unit 1402, and then to generate combined image data. The combined image data thus generated is stored in the RAM 102.

The image data output unit 1407 is the same as the image data output unit 205.

Note that this embodiment assumes that the scaling down and the scaling up both include conversion by a factor of 1/1, i.e., conversion to the same size.

Figure 15:
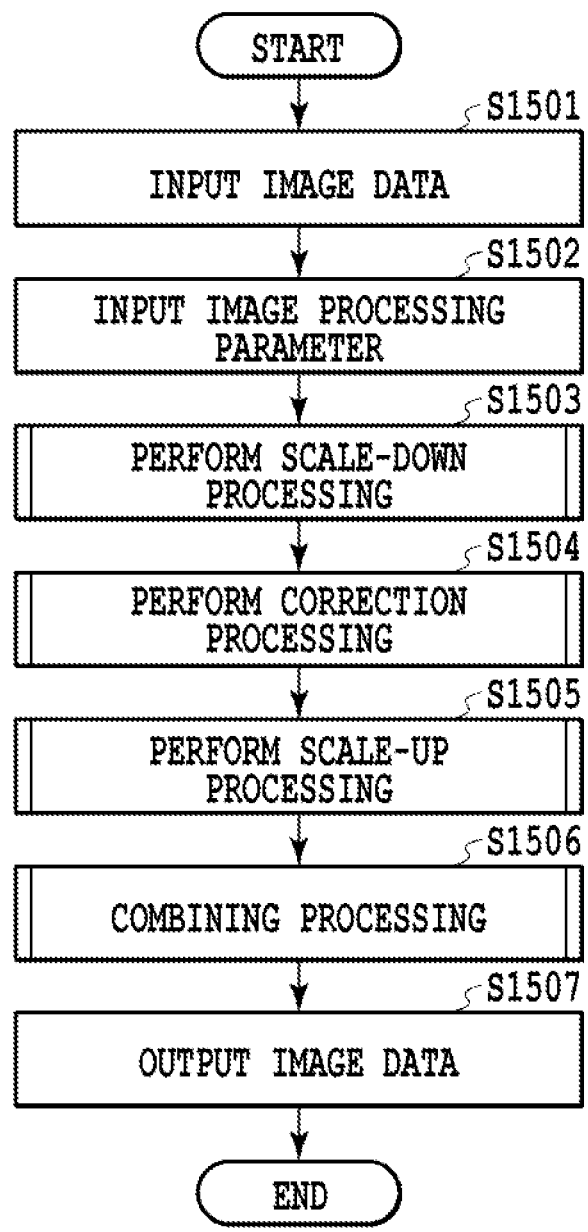
FIG. 15 is a flowchart diagram showing an example of a flow of image processing in Embodiment 4 of the present invention.

With reference to a flowchart in FIG. 15, details are given below of each processing performed in the logical configuration of the image processing apparatus described using FIG. 14.

Figure 21:
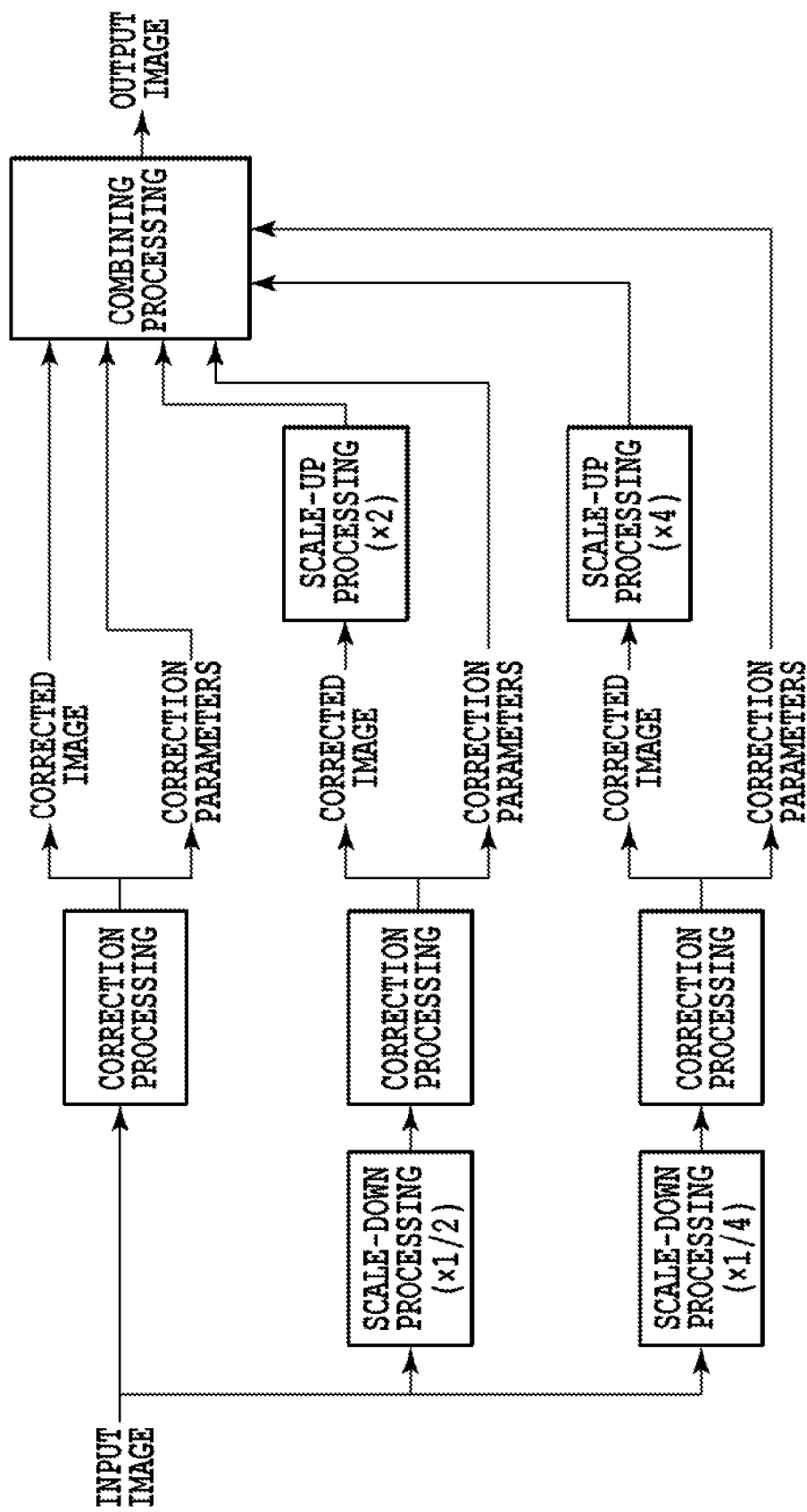
FIG. 21 is a schematic diagram showing a configuration of the image processing in Embodiment 4 of the present invention.

In addition, FIG. 21 is a schematic diagram showing a flow of processing in Embodiment 4.

In Step S1501, the image data input unit 1401 inputs image data.

In Step S1502, the parameter input unit 1402 inputs image processing parameters. The parameters inputted here include one noise reduction processing parameter, a scale-down processing parameter, and a combining processing parameter. The scale-down processing parameter may be any parameter that allows determination of the number of stages in which scaled-down images are generated from an input image. Of course, the scale-down processing parameter may be specific factors, or in a case when the number of stages is three and when the scale-down processing parameter is a value "3" indicating three stages, 1/1, 1/2, and 1/4, including the input image itself, may be defined from the parameter value "3." The combining processing parameter is, for example, a command of a combining method, thresholds corresponding to the correction parameters generated by the correction processing unit 1404, or a combining ratio used to combine multiple pieces of corrected image data.

In an example described below in this embodiment, one noise reduction processing parameter, a three-stage scale-down processing parameter indicating scales of 1/1, 1/2, and 1/4, a combining processing parameter indicating two thresholds Eth1' and Eth2' corresponding to the correction parameters are inputted.

In Step S1503, the scale-down processing unit 1403 generates pieces of scaled-down image data of the image data inputted in Step S1501 based on the scale-down processing parameter inputted in Step S1502. The number of pieces of scaled-down image data to be generated is determined according to the scale-down processing parameter. Since the three-stage scale-down processing parameter is inputted in this embodiment, three pieces of scaled-down image data, including one of the actual size, are generated in Step S1503. Details of the generation of the scaled-down image data will be given later.

In Step S1504, based on the noise reduction processing parameter inputted in Step S1502, the correction processing unit 1404 generates a piece of corrected image data and correction parameters for each piece of the scaled-down image data generated in Step S1503. Specifically, in this embodiment, three pieces of corrected image data and correction parameters corresponding to each piece of the corrected image data are generated. Details of the generation of the corrected image data and the correction parameters will be given later.

In Step S1505, the scale-up processing unit 1405 generates pieces of scaled-up image data by performing scale-up processing—bilinear interpolation—on all of the pieces of scaled-down image data generated in Step S1504, so that they are brought back to the original size of the input image data. Details of the generation of the scaled-up image data will be given later.

In Step S1506, the combining processing unit 1406 combines the multiple pieces of scaled-up image data generated in Step S1505, based on the combining processing parameter inputted in Step S1502 and the correction parameters generated in Step S1504. These pieces of scaled-up image data are obtained by scaling up the pieces of corrected image data generated by correcting, in Step S1504, the pieces of scaled-down image data generated in Step S1503. Combined image data is generated by combining these multiple pieces of scaled-up image data. Details of how the combined image data is generated will be given later.

In Step S1507, the image data output unit 1407 outputs the image data thus corrected.

Processing for Generating Scaled-Down Image Data

Figure 16:
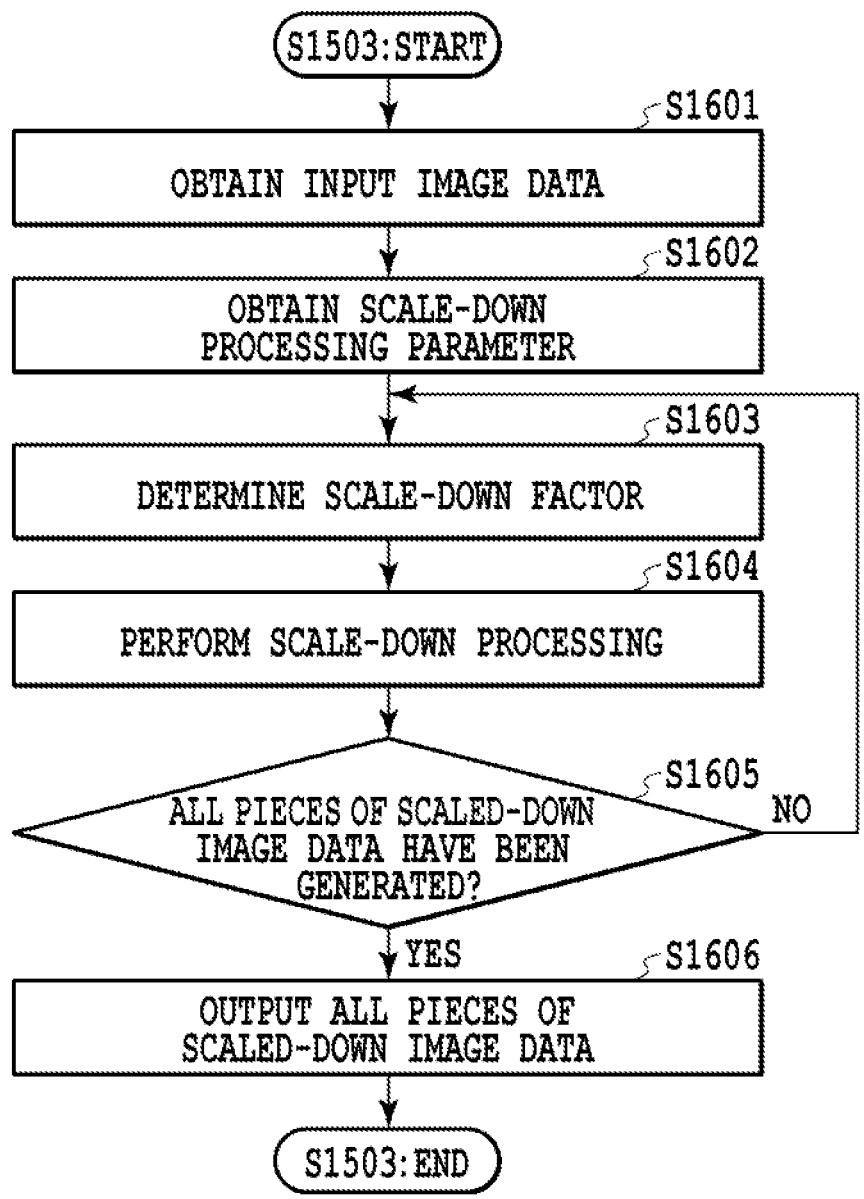
FIG. 16 is a flowchart diagram showing an example of a flow of scale-down processing in Embodiment 4 of the present invention.

With reference to a flowchart in FIG. 16, a description is given in detail below of the scale-down processing in Step S1503, described using FIG. 15.

In Step S1601, the scale-down processing unit 1403 obtains the image data inputted in Step S1501.

In Step S1602, the scale-down processing unit 1403 obtains the scale-down processing parameter inputted in Step S1502.

In Step S1603, the scale-down processing unit 1403 determines scale-down factors from the scale-down processing parameter obtained in Step S1602.

Figure 22:
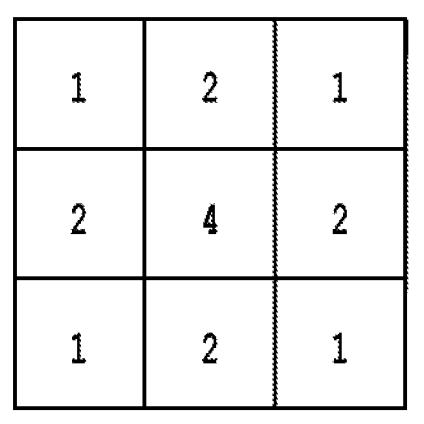

In Step S1604, the scale-down processing unit 1403 performs processing for scaling down the image data obtained in Step S1601 by the factors determined in Step S1603. Generally, in a case when image data is scaled down without being subjected to low-pass filter processing beforehand, folding noise is generated. As a result, patterns of the folding noise appear in scaled-down image data finally outputted. To avoid this, in this embodiment, the scale-down processing is performed by, for example, using an algorithm including the average pixel method or other low-pass filter processing, or by applying bilinear interpolation, or the like, after the low-pass filter processing is performed. Filters used in the low-pass filter processing are determined based on the scale-down factors determined in Step S1603. For example, a filter shown in FIG. 22 is used for a scale-down factor of ½. Note that the size and coefficients of the filter are not limited to what is shown.

In Step S1605, the scale-down processing unit 1403 determines whether or not all pieces of scaled-down image data have been generated, based on the scale-down processing parameter. Specifically, the scale-down processing unit 1403 determines whether or not the scaled-down image data has been generated according to all of the scale-down factors indicated by the scale-down processing parameter obtained in Step S1602. The scale-down processing unit 1403 proceeds to Step S1606 in a case when the scale-down processing has been completed, or proceeds to Step S1603 to continue the processing in a case when the scale-down processing has not been completed yet.

In Step S1606, the scale-down processing unit 1403 outputs all the pieces of scaled-down image data thus generated.

(Correction Processing)

Figure 17:
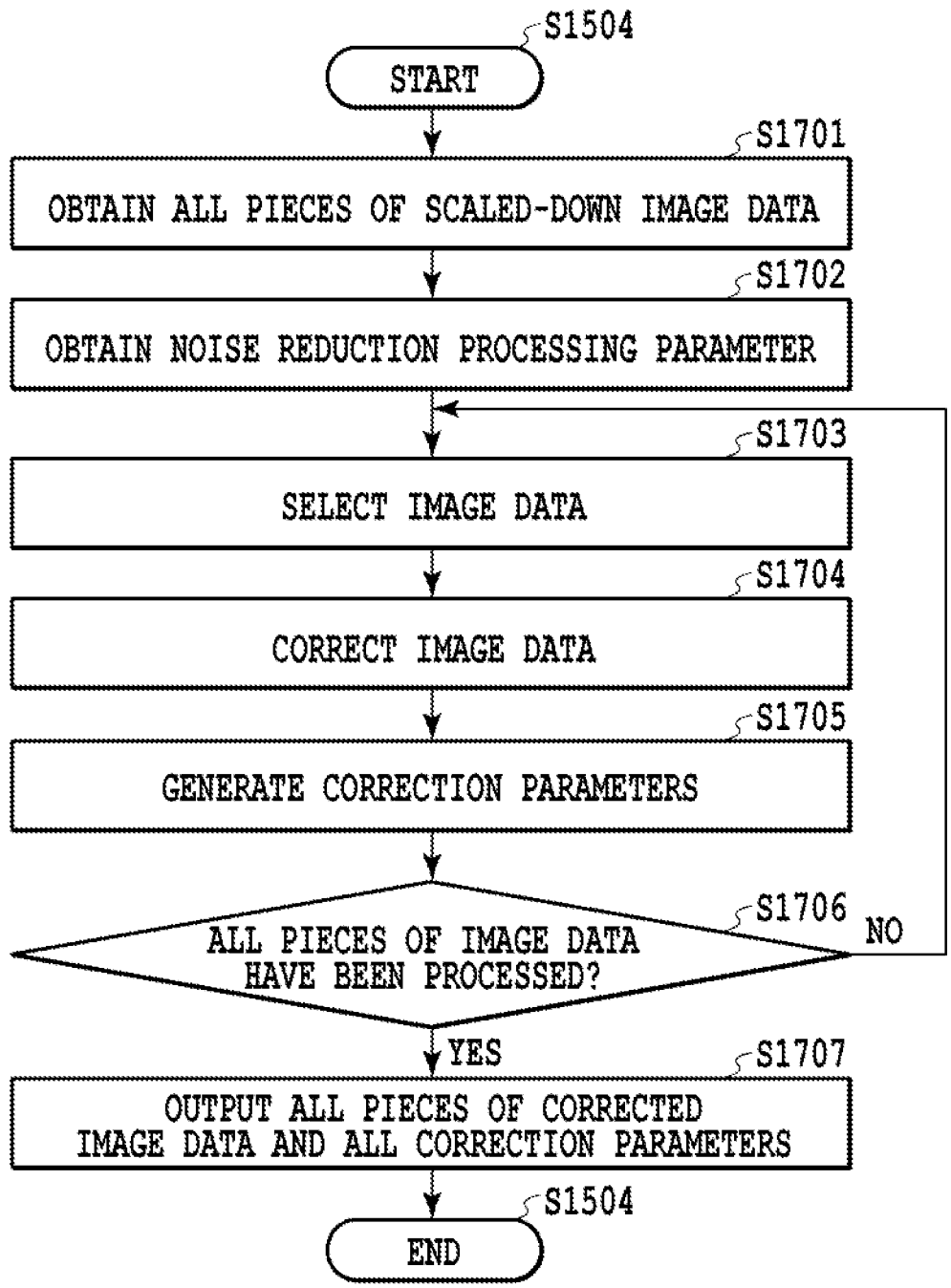
FIG. 17 is a flowchart diagram showing an example of a flow of noise reduction processing in Embodiment 4 of the present invention.

With reference to a flowchart in FIG. 17, a description is given in detail below of the correction processing in Step S1504 described using FIG. 15.

In Step S1701, the correction processing unit 1404 obtains all of the pieces of scaled-down image data generated in Step S1503. In a case described in this embodiment, the scaled-down image data also include image data of the actual size, namely, the image data inputted in Step S1501. In a case when the scaled-down image data do not include image data of the actual size, the image data inputted in Step S1501 is also obtained in Step S1701. In other words, in this embodiment, the pieces of image data, the resolutions of which are converted, and the image data, which is the input image, are used as pieces of image data to be processed.

In Step S1702, the correction processing unit 1404 obtains the noise reduction processing parameter inputted in Step S1502.

In Step S1703, the correction processing unit 1404 selects one piece of image data from the multiple pieces of scaled-down image data obtained in Step S1701.

In Step S1704, the correction processing unit 1404 corrects the image data selected in Step S1703 by using the noise reduction processing parameter obtained in Step S1702, and thereby generates a piece of corrected image data. Specifically, Formulas (1) to (3) may be sequentially applied to each pixel. Unlike Embodiments 1 to 3, all of the pieces of image data are corrected by use of a common noise reduction processing parameter.

In Step S1705, the correction processing unit 1404 generates a correction parameter for each pixel of the corrected image. A correction parameter Ei for each pixel is obtained by Formula (4) using a ratio of the sum of the weights wj calculated by Formula (3) to the square sum thereof.

In Step S1706, the correction processing unit 1404 determines whether or not all of the pieces of image data obtained in Step S1701 have been subjected to the correction processing. The correction processing unit 1404 proceeds to Step S1707 in a case when the correction processing has been completed for all of the pieces of image data, or proceeds to Step S1703 to continue the processing by selecting an unselected piece of image data in a case when the correction processing has not been completed yet.

In Step S1707, the correction processing unit 1404 outputs the multiple pieces of corrected image data generated in Step S1704 and the correction parameters corresponding to each of the multiple pieces of corrected image data generated in Step S1705.

(Scale-Up Processing)

Figure 18:
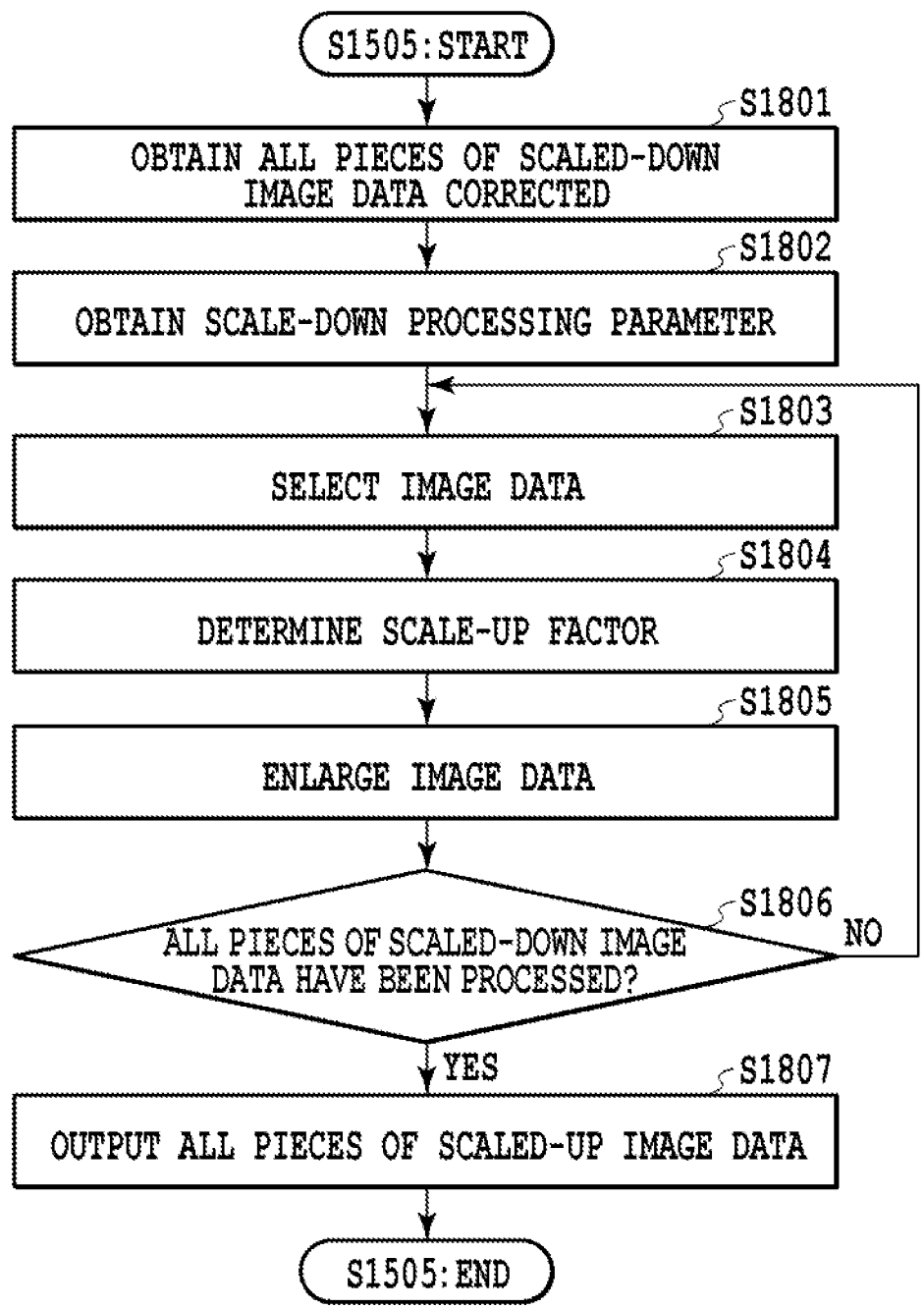
FIG. 18 is a flowchart diagram showing an example of a flow of scale-up processing in Embodiment 4 of the present invention.

With reference to a flowchart in FIG. 18, a description is given in detail below of the correction processing in Step S1505 described using FIG. 15.

In Step S1801, the scale-up processing unit 1405 obtains all of the pieces of corrected image data generated in Step S1504. More specifically, the scale-up processing unit 1405 obtains all of the pieces of scaled-down image data that have been subjected to the correction processing.

In Step S1802, the scale-up processing unit 1405 obtains the scale-down processing parameter inputted in Step S1502.

In Step S1803, the scale-up processing unit 1405 selects one piece of image data from the multiple pieces of corrected image data obtained in Step S1801.

In Step S1804, using the scale-down processing parameter obtained in Step S1802, the scale-up processing unit 1405 determines a scale-up factor for the image data selected in Step S1803. The scale-up factor is a factor for bringing the selected scaled-down image to the size of the input image. Thus, the scale-up factor can also be determined based on the input image data, without using the scale-down processing parameter.

In Step S1805, the scale-up processing unit 1405 generates a piece of scaled-up image data by performing scale-up processing on the selected image data, the scale-up processing being the bilinear interpolation. A method of the scale-up processing is not limited to the bilinear interpolation, but may be, for example, a nearest neighbor method, a bicubic method, a Lanczos method, or the like.

In Step S1806, the scale-up processing unit 1405 determines whether or not all of the pieces of scaled-down image data obtained in Step S1801 have been subjected to the scale-up processing. The scale-up processing unit 1405 proceeds to Step S1807 in a case when the scale-up processing has been completed for all the pieces of scaled-down image, or proceeds to Step S1803 to continue the processing in a case when the scale-up processing has not been completed yet.

In Step S1807, the scale-up processing unit 1405 outputs all of the pieces of scaled-up image data generated in Step S1805.

(Combining Processing)

Figure 19:
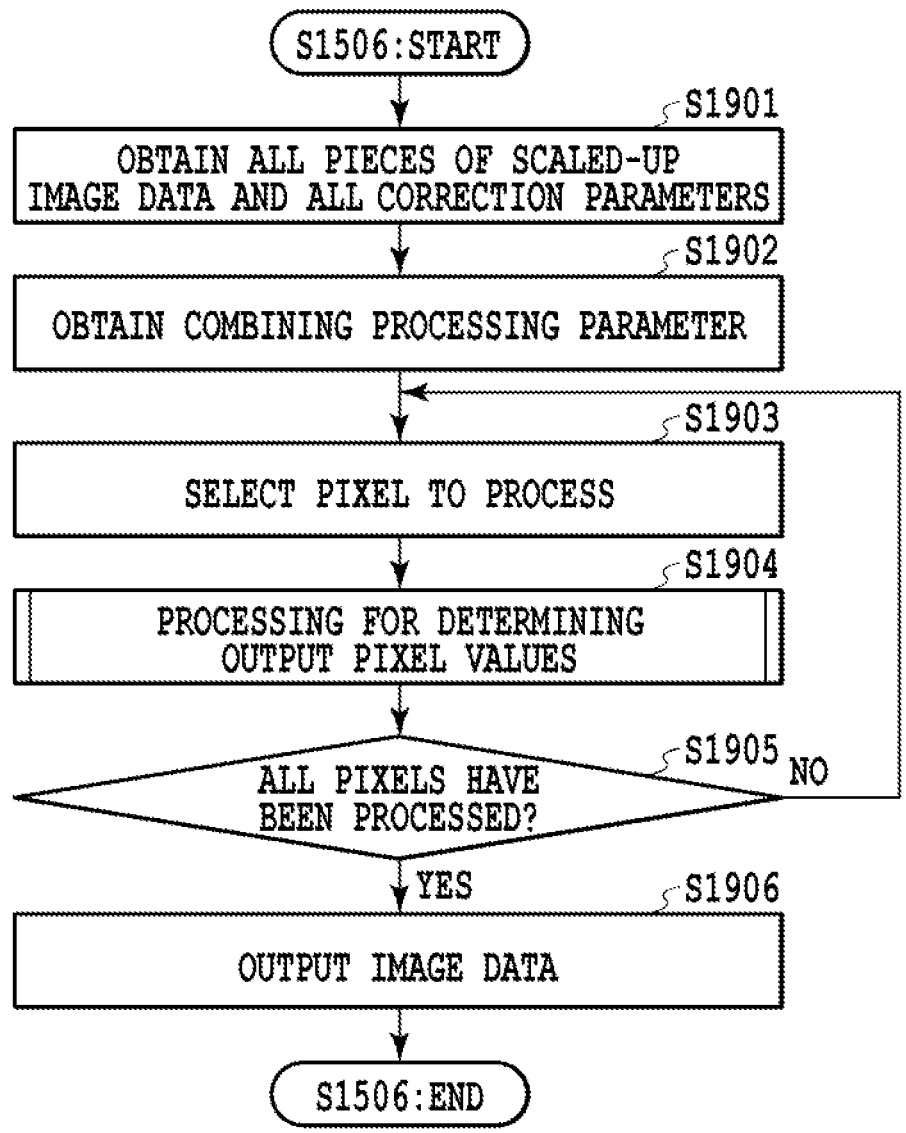
FIG. 19 is a flowchart diagram showing an example of a flow of combining processing in Embodiment 4 of the present invention.

With reference to a flowchart in FIG. 19, a description is given in detail below of the correction processing in Step S1506 described using FIG. 15.

In Step S1901, the combining processing unit 1406 obtains the pieces of scaled-up image data generated in Step S1505 and the correction parameters generated in Step S1504, the parameters corresponding to each piece of the scaled-up image data. Note that the correction parameters are generated for the respective pixels of each piece of the scaled-down image. Thus, the correction parameters generated for the respective pixels of a scaled-down image, which is the original image of a certain piece of scaled-up image data are used as correction parameters for the pixels of the certain scaled-up image. For example, in a case when a correction parameter for a pixel (x,y) in an image scaled down to ¼ is Ex, then correction parameters for four pixels, corresponding to the pixel (x,y), in an image scaled-up four times are also handled as Ex.

In Step S1902, the combining processing unit 1406 obtains the combining processing parameter inputted in Step S1502.

In Step S1903, the combining processing unit 1406 selects any corresponding unprocessed pixels in the respective pieces of scaled-up image data obtained in Step S1901. Alternatively, the combining processing unit 1406 may select an unprocessed pixel in the image data inputted in Step S1501.

In Step S1904, the combining processing unit 1406 determines an output pixel value of the pixels selected in Step S1903. Specifically, the combining processing unit 1406 determines an output pixel value of the selected values based on the multiple pieces of scaled-up image data and the correction parameters corresponding to each piece of the scaled-up image data obtained in Step S1901, as well as on the combining processing parameter obtained in Step S1902.

Figure 20:
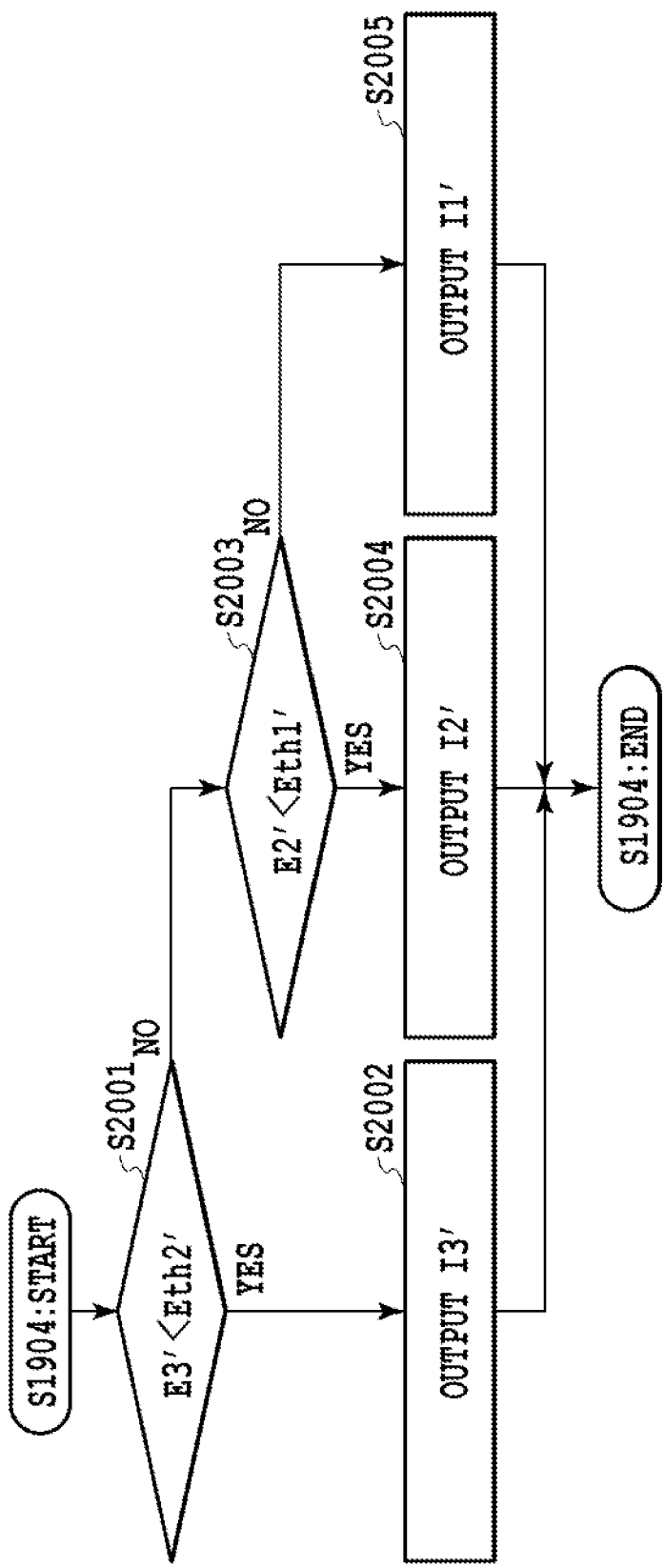
FIG. 20 is a flowchart diagram showing an example of a flow of processing for determining output pixel values in Embodiment 4 of the present invention.

Here, with reference to a flowchart in FIG. 20, a description is given of a method of combining three pieces of corrected image data. Assume that pixel values of the pixels of the three pieces of scaled-up image data selected in Step S1903 are $I1'$, $I2'$, and $I3'$, in ascending order of their scale-down factors, and that the correction parameters corresponding to the pixels of the scaled-up image data are $E1'$, $E2'$, and $E3'$, respectively. Note that $I1'$ and $E1'$ are results of a scale-down factor of 1/1, i.e., not being subjected the scale-down processing. Moreover, the thresholds obtained in Step S1902 as the combining processing parameter are $Eth1'$ and $Eth2'$. As described earlier, a smaller value of the correction parameter indicates a higher noise reduction effect, and a larger value thereof indicates a lower noise reduction effect.

In Step S2001, the combining processing unit 1406 compares the correction parameter $E3'$ with the threshold $E_{th}2'$. In other words, the combining processing unit 1406 compares the correction parameter $E3'$, which is obtained for the scaled-down image generated with a large scale-down factor, with the threshold $E_{th}2'$. In a case when the correction parameter $E3'$ is smaller than the threshold $Eth2'$, i.e., when the noise reduction effect is higher than the value instructed with the threshold, the combining processing unit 1406 proceeds to Step S2002 to output the pixel value $I3'$. In a case when the correction parameter $E3'$ is equal to or larger than the threshold $E_{th}2'$, i.e., when the noise reduction effect is lower than the value instructed with the threshold, the combining processing unit 1406 proceeds to Step S2003. In Step S2003, the combining processing unit 1406 similarly compares the correction parameter $E2'$ with the threshold $E_{th}1'$, and in a case when the correction parameter $E2'$ is smaller than the threshold $E_{th}'$, proceeds to Step S2004 to output the pixel value $I2'$. On the other hand, in a case when the correction parameter $E2'$ is equal to or larger than the threshold $E_{th}'$, the combining processing unit 1406 proceeds to Step S2005 and outputs the pixel value $I1'$. Note that the determination of output pixel values may be performed by any desired method according to the combining command included in the combining processing parameter. For example, as the output pixel value, the combining processing unit 1406 may use a pixel value of the corrected image data having a high noise reduction effect. However, it should be considered that a scaled-down image has reduced noise, since it is subjected to low-pass filter processing. Although three pieces of corrected image data are combined in this embodiment, as an example, the number of pieces of corrected image data to be combined may be any number more than one.

In Step S1905, the combining processing unit 1406 determines whether the output pixel value has been determined for all of the pixels, or not. The combining processing unit 1406 proceeds to Step S1906 in a case when the output pixel value has been determined for all of the pixels, or proceeds to Step S1903 to continue the processing in a case when the output pixel value has not been determined for all of the pixels yet.

In Step S1906, the combining processing unit 1406 outputs combined image data thus generated.

With the above processing, it is possible to generate corrected image data similar to that in Embodiment 1, without multiple noise reduction processing parameters. This is because scaling down an image relatively scales up the pixel placement used as a target area or pixels used as a target area. For example, at a portion in a solid area, corrected image data obtained from a scaled-down image can be used as an output pixel value, and at other portions, corrected image data obtained from an input image can be used as the output pixel value.

Embodiment 5

In the method described in Embodiment 4, corrected image data optimum for each area are generated from one noise reduction processing parameter by using multiple pieces of image data obtained by scaling an input image, and an output pixel values are selected by the combining processing. As described in Embodiment 1, it is also possible to use, as the output pixel value, the sum of the pixel values of the respective pieces of corrected image data that are weighted, based on the combining ratio according to the degrees of noise reduction effect indicated by the correction parameters. In this case, methods for the scale-up processing and the combining processing are different from those in Embodiment 4. Thus, in a method described in this embodiment, output image data is generated by scaling down an input image in stages to prepare pieces of image data, applying noise reduction processing to each piece of the image data, generating pieces of image data optimum for each area, and combining the pieces of image data by a combining ratio according to the sizes of their correction parameters. Note that the hardware configuration of an image processing apparatus of Embodiment 5 is the same as that described in Embodiment 1, and is, therefore, not described again here.

Figure 23:
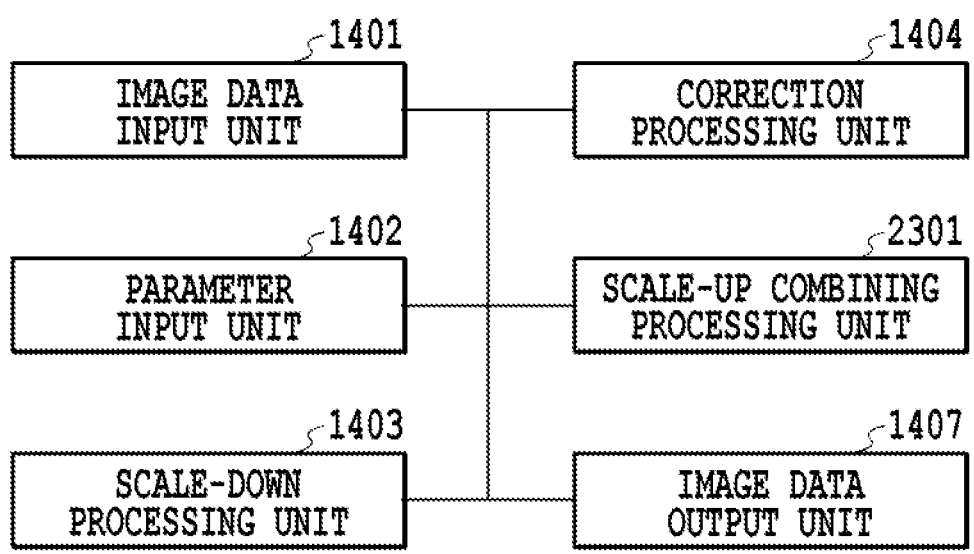
FIG. 23 is a block diagram showing an example of the logical configuration of an image processing apparatus of Embodiment 5 of the present invention.

FIG. 23 is a schematic diagram showing an example of the logical configuration of the image processing apparatus of this embodiment. The image processing apparatus in FIG. 23 has the image data input unit 1401, the parameter input unit 1402, the scale-down processing unit 1403, the correction processing unit 1404, a scale-up combining processing unit 2301, and the image data output unit 1407. The scale-up combining processing unit 2301 replaces the scale-up processing unit 1405 and the combining processing unit 1406 in Embodiment 4.

The scale-up combining processing unit 2301 is configured, based on a command from the CPU 101, to obtain all of the pieces of corrected image data and the correction parameters corresponding to each piece of the corrected image data generated by the correction processing unit 1404, and then to generate combined image data. The combined image data thus generated is stored in the RAM 102.

Figure 24:
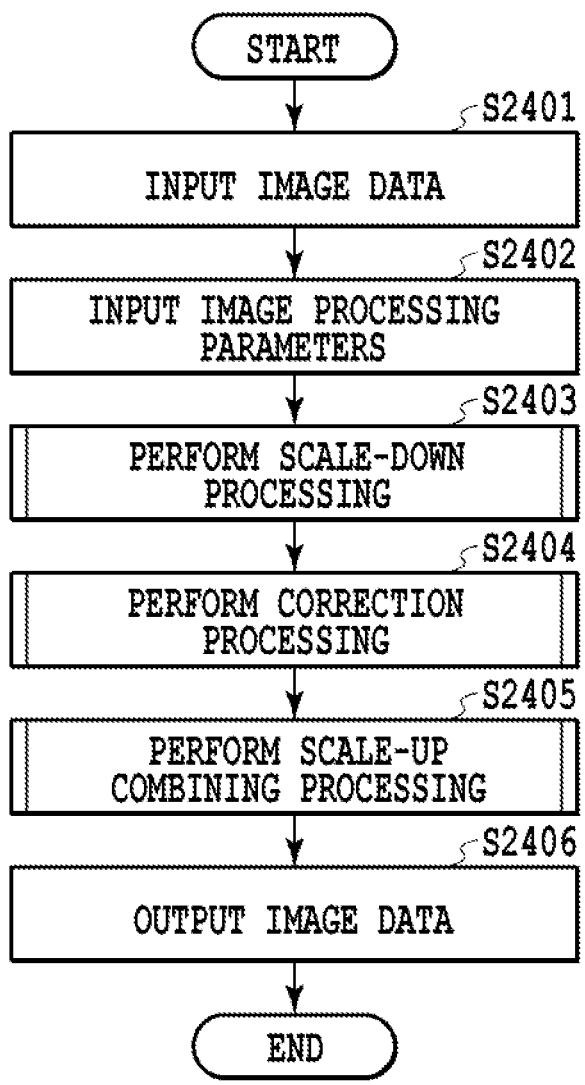
FIG. 24 is a flowchart diagram showing an example of a flow of image processing in Embodiment 5 of the present invention.

With reference to a flowchart in FIG. 24, details are given below of each processing performed in the logical configuration of the image processing apparatus described using FIG. 23.

Steps S2401 to S2404 are the same as Steps S1501 to S1504.

In Step S2405, the scale-up combining processing unit 2301 obtains all of the pieces of corrected image data and the correction parameters corresponding to each piece of the corrected image data generated by the correction processing unit 1404. The corrected image data are scaled-down image data subjected to the scale-down processing in Step S2403. Then, the scale-up combining processing unit 2301 performs scale-up processing and combining processing on each of the images, from one having the smallest size, and thereby generates final combined image data. Details of the scale-up combining processing will be given later.

Step S2406 is the same as Step S1507.

Details of the Scale-Up Combining Processing

Figure 25:
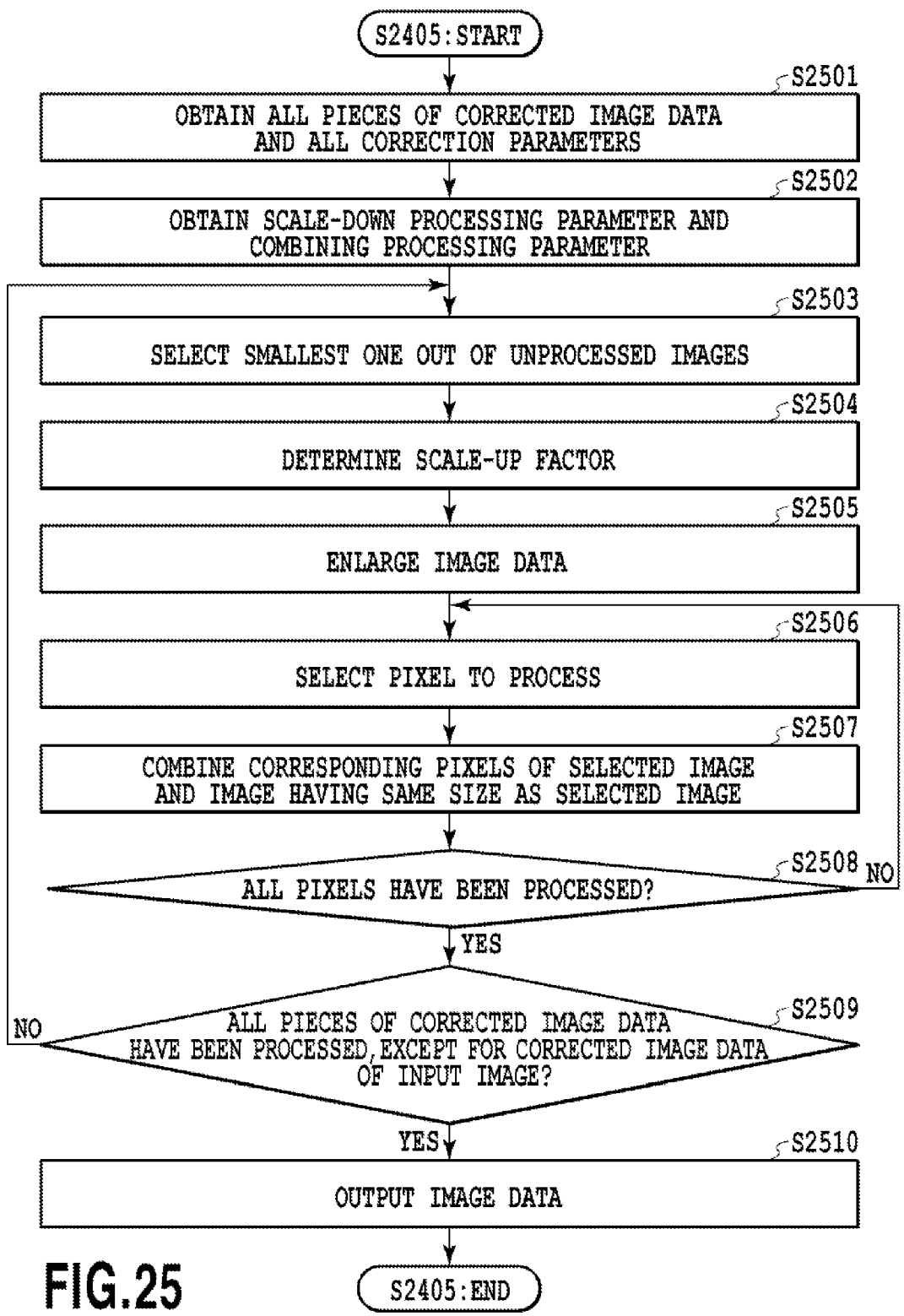
FIG. 25 is a flowchart diagram showing an example of a flow of scale-up combining processing in Embodiment 5 of the present invention.
Figure 26:
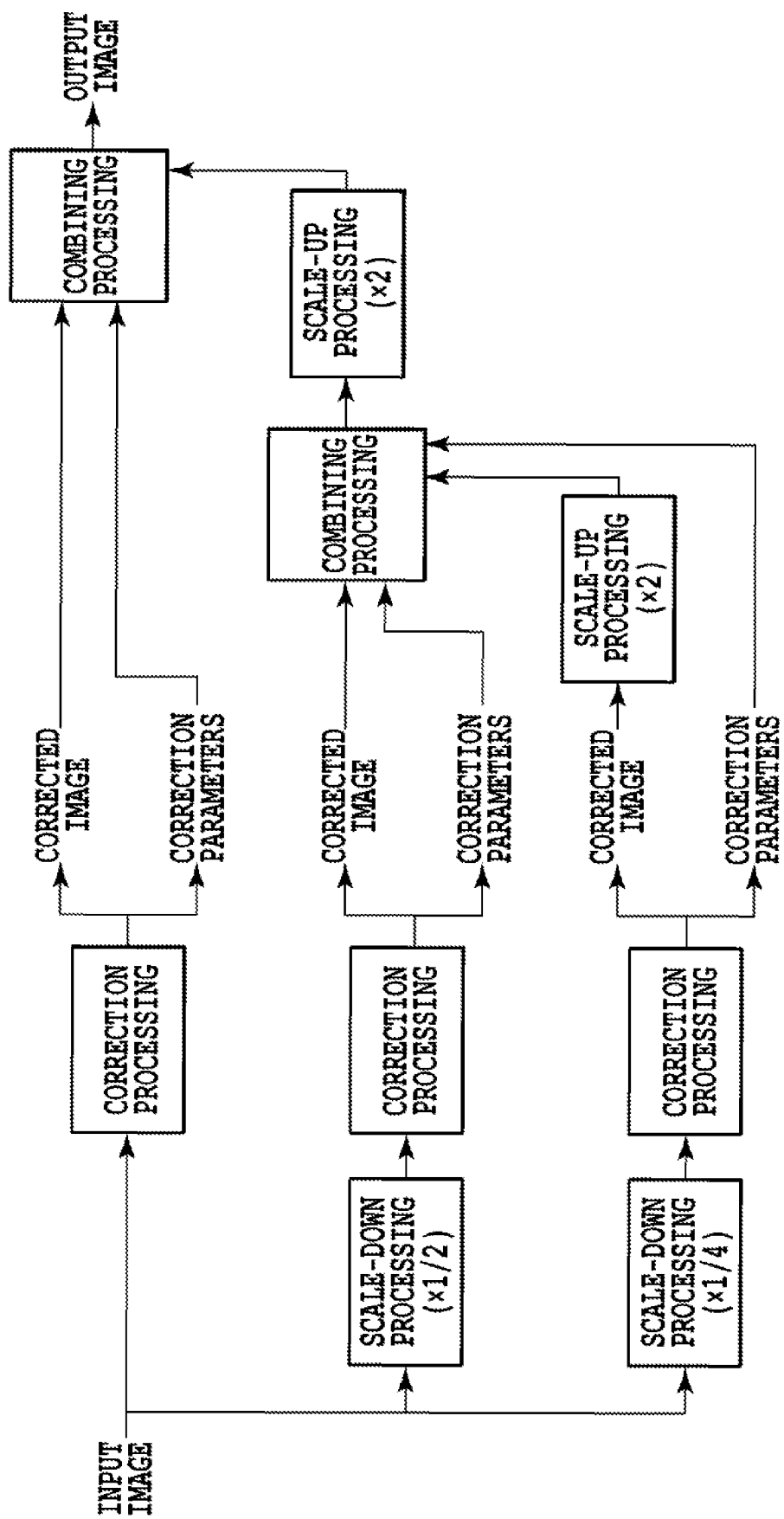
FIG. 26 is a schematic diagram showing a configuration of the image processing in Embodiment 5 of the present invention.

With reference to a flowchart in FIG. 25, details are given below of the scale-up combining processing in Step S2405 described using FIG. 24. FIG. 26 is a schematic diagram showing a processing flow of Embodiment 5.

In Step S2501, the scale-up combining processing unit 2301 obtains all of the pieces of corrected image data and the correction parameters corresponding to each piece of the corrected image data generated in S2404.

In Step S2502, the scale-up combining processing unit 2301 obtains the scale-down processing parameter and the combining processing parameter inputted in Step S2402.

In Step S2503, the scale-up combining processing unit 2301 selects a piece of image data from the multiple pieces of image data obtained in Step S2501, the selected image data having the smallest size among unprocessed pieces of image data.

In Step S2504, using the scale-down processing parameter obtained in Step S2502, the scale-up combining processing unit 2301 determines a scale-up factor for the scaled-down image selected in Step S2503. The scale-up factor determined in Step S2504 is a factor for bringing the scaled-down image selected in Step S2503 back to the size of a scaled-down image that is smallest next to the scaled-down image selected in Step S2503, among the pieces of corrected image data obtained in Step S2501. Thus, the scale-up factor can also be determined by not using the scale-down processing parameter, but using the pieces of corrected image data obtained in Step S2501.

In Step S2505, the scale-up combining processing unit 2301 generates scaled-up image data by performing scale-up processing on the scaled-down image selected in Step S2503, the scale-up processing being the bilinear interpolation. A method for the scale-up processing is not limited to the bilinear interpolation, but may be, for example, a nearest neighbor method, a bicubic method, a Lanczos method, or the like.

In Step S2506, the scale-up combining processing unit 2301 selects an unprocessed pixel of the scaled-up image data generated in Step S2505.

In Step S2507, the scale-up combining processing unit 2301 combines corresponding pixels of the two pieces of image data. To be more specific, the scale-up combining processing unit 2301 obtains the scaled-up image data generated in Step S2505 and the image data selected from the pieces of corrected image data obtained in S2501 as being larger by one stage than the scaled-down image selected in Step S2503. The scale-up combining processing unit 2301 then combines corresponding pixels of the two pieces of image data obtained. Here, the image data selected from the pieces of corrected image data obtained in S2501 as being larger by one stage than the scaled-down image selected in Step S2503 is, in other words, image data of the same size as the scaled-up image data generated in Step S2505. A result of the combining is saved in, out of the two pieces of image data used in the combining, the corrected image data larger by one stage than the image data selected in Step S2503. Thus, the corrected image data obtained in Step S2501 is updated here. Note that the determination of output pixel values may be performed by any desired method according to the combining command included in the combining processing parameter. For example, the sum of the pixel values of the two pieces of corrected image data that are weighted based on the combining ratio that is according to the degrees of noise reduction effect indicated by the correction parameters can be used as the output pixel value. Specifically, since a smaller correction parameter indicates a higher noise reduction effect, it is possible, for example, to weight the pixel values with the reciprocals of the correction parameters, so that large weights are given to pixels offering a high noise reduction effect. It goes without saying that the parameters necessary to obtain these output pixel values may be obtained in Step S2502 as the combining processing parameter.

In Step S2508, the scale-up combining processing unit 2301 determines whether or not the output pixel value has been determined for all of the pixels in the image data selected in Step S2503. The scale-up combining processing unit 2301 proceeds to Step S2509 in a case when the output pixel value has been determined for all of the pixels, or proceeds to Step S2506 to continue the processing in a case when the output pixel value has not been determined for all of the pixels yet. In this way, the scale-up combining processing unit 2301 combines a scaled-up image, obtained by scaling up a small-size first corrected image to the size of a second corrected image that is the smallest next to the first corrected image, and the second corrected image, and updates the second corrected image data.

In Step S2509, the scale-up combining processing unit 2301 determines whether or not the scale-up combining processing has been performed on all of the pieces of corrected image data obtained in Step S2501, except for the corrected image data of the input image data. Since the processing is performed on the images from the smallest to the next smallest, and so on, the scale-up combining processing unit 2301 may determine whether or not the scaled-up image data generated in Step S2505 has the same size as the input image. The scale-up combining processing unit 2301 proceeds to Step S2510 in a case when the scale-up combining processing has been completed for all of the pieces of corrected image data, except for the corrected image data of the input image data, or proceeds to Step S2503 to continue the processing in a case when the scale-up combining processing has not been completed yet.

In Step S2510, the scale-up combining processing unit 2301 outputs the combined image data.

With the above processing, it is possible to generate pieces of corrected image data optimum for the each area by using multiple images obtained by scaling an input image, and to output a combined image obtained by combining the pieces of corrected image data.

Embodiment 6

In Embodiment 1, a description is given with respect to the correction processing for sequentially applying multiple noise reduction processing parameters to input image data. However, this invention is not limited to the correction processing, and parallel processing can also be performed. In this embodiment, therefore, the parallel processing for the correction processing of Embodiment 1 will be described. This embodiment is the same as Embodiment 1, with the exception of the use of two different noise reduction processing parameters and, thus, only the difference from Embodiment 1 will be described.

Figure 27:
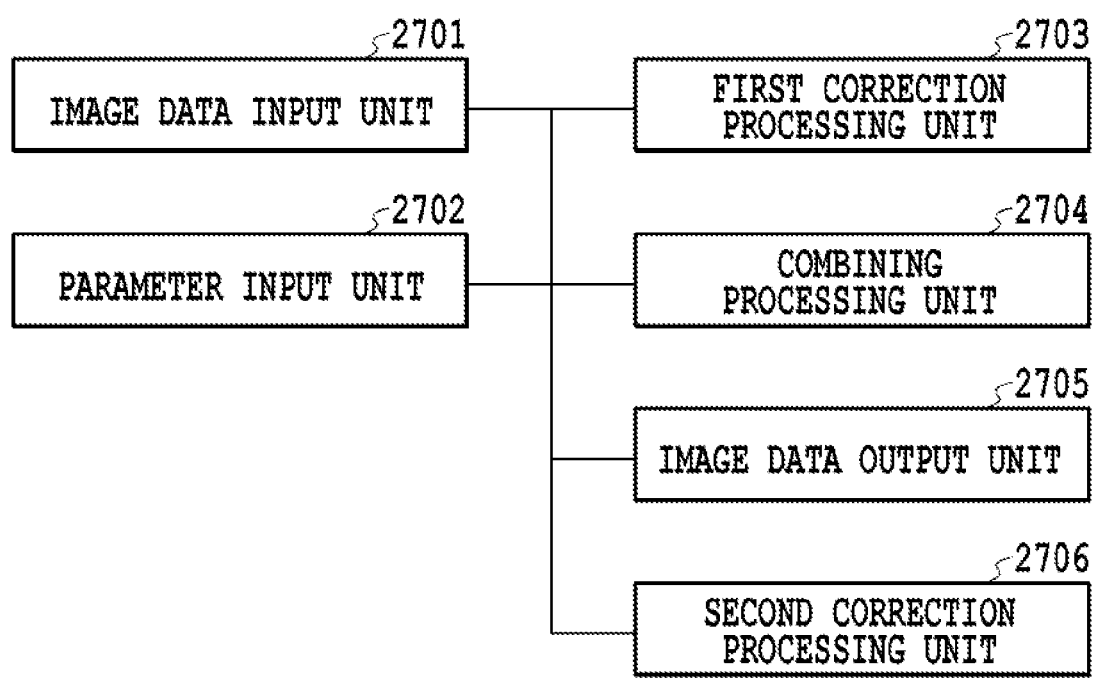
FIG. 27 is a block diagram showing an example of the logical configuration of an image processing apparatus of Embodiment 6 of the present invention.
Figure 28:
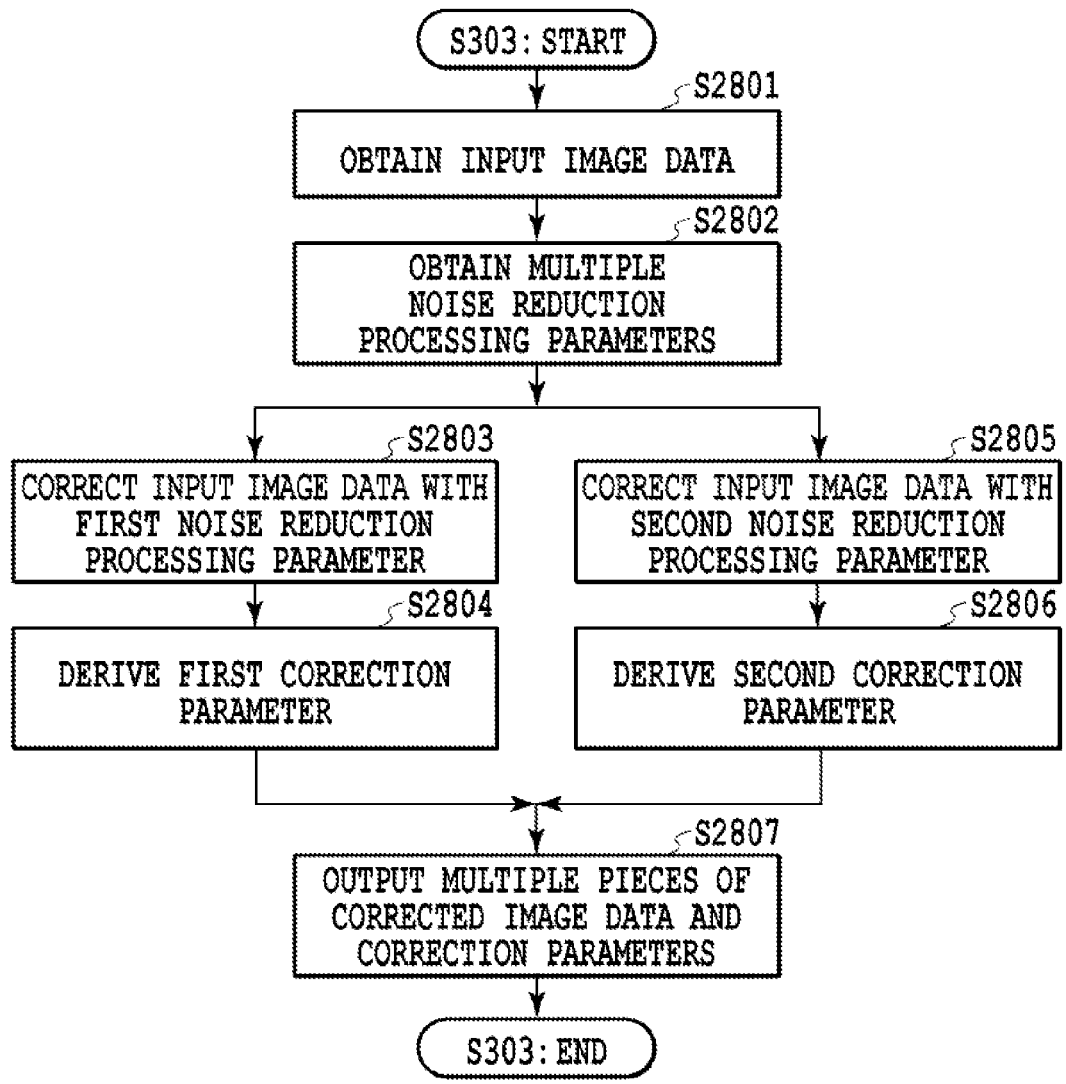
FIG. 28 is a flowchart diagram showing an example of a flow of image processing in Embodiment 6 of the present invention.
Figure 29:
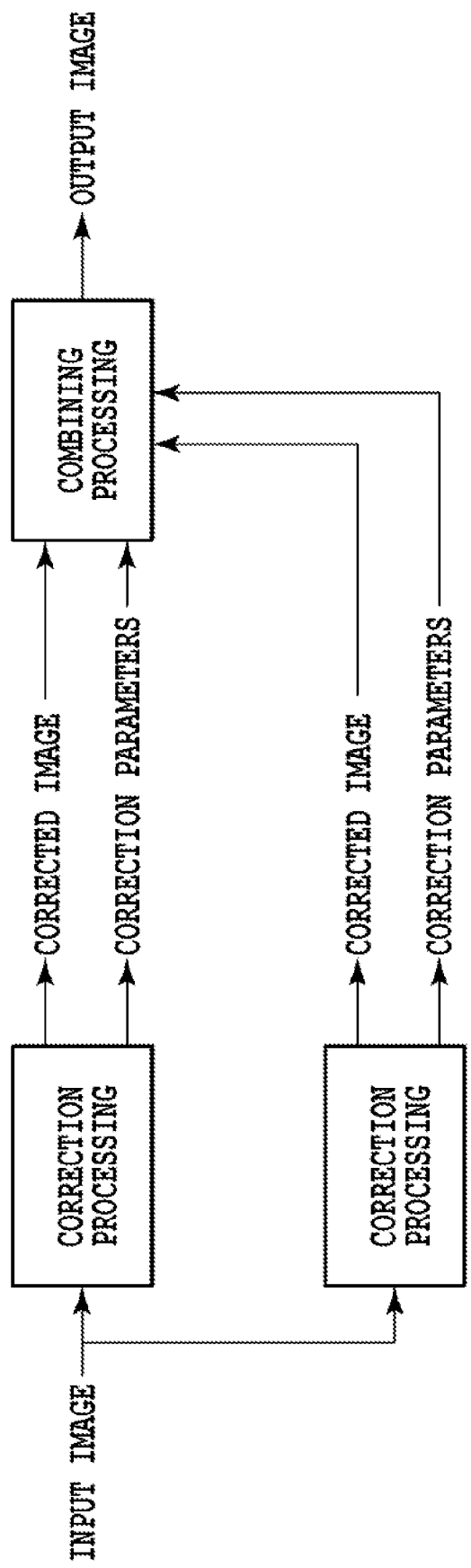
FIG. 29 is a schematic diagram showing a configuration of the image processing in Embodiment 6 of the present invention.

FIG. 27 is a schematic diagram showing an example of the logical configuration of the image processing apparatus of this embodiment. The image processing apparatus in FIG. 27 includes an image data input unit 2701, a parameter input unit 2702, a first correction processing unit 2703, a combining processing unit 2704, an image data output unit 2705, and a second correction processing unit 2706. Such a configuration is the same as that of Embodiment 1, with the exception of two correction processing units provided therein. In each of the first correction processing unit 2703 and the second correction processing unit 2706, parameters of different target pixel groups are set among noise reduction processing parameters, the target pixel groups determining the similarity between the target pixel and its reference pixels. Specifically, the target pixel groups set in each of the first correction processing unit 2703 and the second correction processing unit 2706 are different, at least in their number of pixels and pixel placements. Each process in the logical configuration of the image processing apparatus described in FIG. 27 is almost the same as that described in FIG. 3. Therefore, only the correction processing in step S303 that is the difference from Embodiment 1 will be described with reference to the flowchart of FIG. 28. FIG. 29 is a schematic diagram showing data flow.

In step S2801, the first correction processing unit 2703 and the second correction processing unit 2706 obtain image data inputted in step S301.

In step S2802, the first correction processing unit 2703 and the second correction processing unit 2706 obtain multiple noise reduction processing parameters inputted in step S302.

In step S2803, the first correction processing unit 2703 corrects input image data with one parameter of multiple noise reduction processing parameters obtained in step S2802, and generates first correction image data.

In step S2804, the first correction processing unit 2703 derives a first correction parameter.

In step S2805, the second correction processing unit 2706 corrects input image data with parameters having target pixel groups different from that in step S2803, among multiple noise reduction processing parameters obtained in step S2802, and generates second correction image data.

In step S2806, the second correction processing unit 2706 derives a second correction parameter.

Steps S2803 and S2804, and steps S2805 and S2806 are each processed in parallel.

In step S2807, the first correction processing unit 2703 and the second correction processing unit 2706 output the first correction image data, the first correction parameter, the second correction image data, and the second correction parameter derived in steps S2803 to S2806.

With the above processing, correction of input image data by multiple noise reduction processing parameters is carried out in parallel, thereby allowing high-speed processing. In a case when the input noise reduction processing parameter is equal to or greater than three, the correction processing unit described in FIG. 27 can be provided only for the number of noise reduction processing parameters, and the number of parallel processes described in steps S2803 to S2806 in FIG. 28 can be increased. The parallel processing is applicable, not only to Embodiment 1 as described in this embodiment, but also, to other embodiments.

Other Embodiments

In the examples described in Embodiments 1 to 6, image data is inputted to the image processing application, and image data reduced in noise is generated. However, the processing may be performed on image data captured by an image capturing device, on image processing hardware in the image capturing device. In addition, image data may be transmitted from a client device to an image processing application on a server device, and be processed on the server device.

Aspects of the present invention can also be realized by a computer of a system or an apparatus (or devices such as a CPU or an MPU) that reads out and executes a program recorded on a memory device, to perform the functions of the above-described embodiment(s), and by a method, the steps of which are performed by a computer of a system or an apparatus by, for example, reading out and executing a program recorded on a memory device, to perform the functions of the above-described embodiment(s). For this purpose, the program is provided to the computer, for example, via a network or from a recording medium of various types serving as the memory device (e.g., a computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

We claim:

1. An image processing apparatus that performs noise reduction processing on image data, the apparatus comprising:
   (A) one or more memories storing instructions; and
   (B) one or more processors which, when executing the instructions, cause the image processing apparatus to function as:
      (a) a processing unit configured to perform noise reduction processing on the image data, wherein the processing unit (i) determines a weight for each of a plurality of reference pixels based on a similarity between a target area including a target pixel and a reference area including a reference pixel, the size of the target area being equal to the size of the reference area, and (ii) calculates a value using the reference pixels and the weight corresponding to each of the reference pixels;
      (b) a detecting unit configured to detect a number of reference pixels corresponding to the reference area similar to the target area without reference pixels corresponding to the reference area not similar to the target area among reference pixels set by the processing unit: and
      (c) an output unit configured to output noise-reduced output image data based on a result of the processing performed by the processing unit, wherein the output unit outputs, as the pixel value of the target pixel after noise reduction processing, either a first value, which is calculated in a case when a first pixel group, is set as the target area, or a second value, which is calculated in a case when a second pixel group, different in a number of pixels from the first pixel group, is set as the target area, based on the detected number of reference pixels.

2. The image processing apparatus according to claim 1, wherein the processing unit further (iii) specifies the size of the target area by selecting either a first calculation value, which is calculated using a parameter indicating the first pixel group for setting the target area and the reference area, or a second calculation value, which is calculated using a parameter indicating the second pixel group having more pixels than those in the first pixel group.

3. The image processing apparatus according to claim 1, wherein the processing unit further (iii) selects either the first value or the second value by selecting either a first parameter indicating the first pixel group for setting the target area or a second parameter indicating the second pixel group.

4. The image processing apparatus according to claim 3, further comprising (d) a determination unit configured to divide the image data into areas and to determine whether each of the areas is an edge area, wherein the processing unit selects the first parameter for an edge area to set the first value as the pixel value of the target pixel after noise reduction processing, and selects the second parameter for an area that is not an edge area to set the second value as the pixel value of the target pixel after noise reduction processing.

5. The image processing apparatus according to claim 1, wherein, out of a first calculation value, which is calculated using a parameter indicating the first pixel group for setting the target area and the reference area, and a second calculation value, which is calculated using a parameter indicating the second pixel group having more pixels than those in the first pixel group, the processing unit preferentially outputs the second calculation value.

6. The image processing apparatus according to claim 1, wherein the detecting unit detects the number of reference pixels, a weight for which is not zero.

7. The image processing apparatus according to claim 1, wherein the processing unit calculates the first value and the second value in parallel.

8. The image processing apparatus according to claim 1, wherein the output unit outputs any one of the first value, the second value, and a third value that is calculated in a case when a third pixel group, different in a number of pixels from each of the first pixel group and the second pixel group, is set as the target area.

9. The image processing apparatus according to claim 4, wherein a number of pixels of the first pixel group is less than the number of pixels of the second pixel group.

10. An image processing method of performing noise reduction processing on image data, the method comprising:
    a processing step of performing noise reduction processing on the image data, wherein the processing step comprises (i) determining a weight for each of a plurality of reference pixels based on a similarity between a target area including a target pixel and a reference area including a reference pixel, the size of the target area being equal to the size of the reference area, and (ii) calculating a value using the reference pixels and the weight corresponding to each of the reference pixels;

a detecting step of detecting a number of reference pixels corresponding to the reference area similar to the target area without reference pixels corresponding to the reference area not similar to the target area among reference pixels set by the processing step; and an output step of outputting noise-reduced output image data based on a result of the processing step, wherein the output step comprises outputting, as the pixel value of the target pixel after noise reduction processing, either a first value, which is calculated in a case when a first pixel group, is set as the target area, or a second value, which is calculated in a case when a second pixel group different in a number of pixels from the first pixel group, is set as the target area, based on the detected number of reference pixels.

11. A non-transitory computer-readable recording medium storing a program that causes a computer to function as:

a processing unit configured to perform noise reduction processing on the image data, wherein the processing unit (i) determines a weight for each of a plurality of reference pixels based on a similarity between a target area including a target pixel and a reference area including a reference pixel, the size of the target area being equal to the size of the reference area, and (ii) calculates a value using the reference pixels and the weight corresponding to each of the reference pixels;

a detecting unit configured to detect a number of reference pixels corresponding to the reference area similar to the target area without reference pixels corresponding to the reference area not similar to the target area among reference pixels set by the processing unit; and an output unit configured to output noise-reduced output image data based on a result of the processing performed by the processing unit, wherein the output unit outputs, as the pixel value of the target pixel after noise reduction processing, either a first value, which is calculated in a case when a first pixel group, is set as the target area, or a second value, which is calculated in a case when a second pixel group different in a number of pixels from the first pixel group, is set as the target area, based on the detecting number of reference pixels.

12. The image processing apparatus according to claim 1, wherein the detecting unit detects based on a similarity obtained by setting the second pixel group as the target area.

13. The image processing apparatus according to claim 12, wherein the output unit determines whether or not the detected number of reference pixels satisfies a predetermined condition, and then, the output unit outputs the second value in a case when the detected number of reference pixels satisfies the predetermined condition, whereas the output unit outputs the first value in a case when the detected number of reference pixels does not satisfy the predetermined condition.

14. The image processing apparatus according to claim 13, wherein a number of pixels included in the second pixel group is greater than the number of pixels included in the first pixel group.

15. The image processing apparatus according to claim 1, wherein the processing unit further (iii) calculates the similarity based on the pixel value of each of the pixels included in the target area and the pixel value of each of the pixels included in the reference area.

16. The image processing apparatus according to claim 15, wherein the processing unit determines the weight of the reference pixel based on the similarity.

17. The image processing apparatus according to claim 16, wherein the processing unit sets multiple pixels near the target pixels as the reference pixels in sequence, and then, calculates a weighted average using the multiple pixels and weights corresponding to each of the multiple pixels.

18. The image processing apparatus according to claim 1, wherein the reference pixel corresponding to the reference area determined to be similar to the target area is a reference pixel whose weight is not zero.

19. The image processing apparatus according to claim 1, wherein each of the first pixel group and the second pixel group is a rectangular area.

20. An image processing apparatus that performs noise reduction processing on image data, the apparatus comprising:

one or more circuits that cause the image processing apparatus to function as:
(a) a processing unit configured to perform noise reduction processing on the image data, wherein the processing unit (i) determines a weight for each of a plurality of reference pixels based on a similarity between a target area including a target pixel and a reference area including a reference pixel, the size of the target area being equal to the size of the reference area, and (ii) calculates a value using the reference pixels and the weight corresponding to each of the reference pixels;
(b) a detecting unit configured to detect a number of reference pixels corresponding to the reference area similar to the target area without reference pixels corresponding to the reference area not similar to the target area among reference pixels set by the processing unit: and
(c) an output unit configured to output noise-reduced output image data based on a result of the processing performed by the processing unit, wherein the output unit outputs, as the pixel value of the target pixel after noise reduction processing, either a first value, which is calculated in a case when a first pixel group, is set as the target area, or a second value, which is calculated in a case when a second pixel group different, in a number of pixels from the first pixel group, is set as the target area, based on the detected number of reference pixels.

* * * * *